United States Patent
Tatsuta et al.

(10) Patent No.: US 10,200,604 B2
(45) Date of Patent: Feb. 5, 2019

(54) IMAGE PROCESSING APPARATUS, IMAGE PROCESSING PROGRAM, IMAGE PROCESSING METHOD, MICROSCOPIC SYSTEM

(71) Applicant: Sony Corporation, Tokyo (JP)

(72) Inventors: Hirokazu Tatsuta, Kanagawa (JP); Suguru Dowaki, Kanagawa (JP); Eriko Matsui, Tokyo (JP)

(73) Assignee: Sony Corporation, Tokyo (JP)

( * ) Notice: Subject to any disclaimer, the term of this patent is extended or adjusted under 35 U.S.C. 154(b) by 238 days.

(21) Appl. No.: 15/309,230

(22) PCT Filed: Apr. 9, 2015

(86) PCT No.: PCT/JP2015/002009
§ 371 (c)(1),
(2) Date: Nov. 7, 2016

(87) PCT Pub. No.: WO2015/174011
PCT Pub. Date: Nov. 19, 2015

(65) Prior Publication Data
US 2017/0085789 A1 Mar. 23, 2017

(30) Foreign Application Priority Data
May 14, 2014 (JP) .................................. 2014-100757

(51) Int. Cl.
*H04N 5/232* (2006.01)
*G02B 21/06* (2006.01)
(Continued)

(52) U.S. Cl.
CPC ......... *H04N 5/23232* (2013.01); *G02B 21/06* (2013.01); *G02B 21/241* (2013.01);
(Continued)

(58) Field of Classification Search
None
See application file for complete search history.

(56) References Cited

U.S. PATENT DOCUMENTS

| | | | |
|---|---|---|---|
| 5,124,842 A | 6/1992 | Honda et al. | |
| 2014/0270425 A1* | 9/2014 | Kenny | G06T 7/0012 382/128 |
| 2015/0009315 A1* | 1/2015 | Fukutake | G02B 21/06 348/79 |

FOREIGN PATENT DOCUMENTS

| | | |
|---|---|---|
| JP | 02-192276 A | 7/1990 |
| JP | 4814840 A | 9/2011 |

(Continued)

OTHER PUBLICATIONS

International Search Report and Written Opinion and English translation thereof dated Jul. 14, 2015 in connection with International Application No. PCT/JP2015/002009.
(Continued)

*Primary Examiner* — Dakshesh D Parikh
(74) *Attorney, Agent, or Firm* — Wolf, Greenfield & Sacks, P.C.

(57) ABSTRACT

To provide an image processing apparatus, an image processing program, an image processing method, and a microscopic system that are capable of acquiring a high-resolution image that is suitable for scientific verification.
An image processing apparatus according to the present technology includes an image conversion unit and an image generation unit. The image conversion unit converts a first picked-up image and a second picked-up image into frequency components, the first picked-up image being obtained by picking up an image of an observation target object with first illumination light via a microscope optical system, the second picked-up image being obtained by picking up an image of the observation target object with
(Continued)

second illumination light via the microscope optical system, the second picked-up image having a contrast in a low frequency band lower than that of the first picked-up image and a contrast in a high frequency band higher than that of the first picked-up image. The image generation unit combines a low frequency component of the first picked-up image and a high frequency component of the second picked-up image with each other to generate a composite image.

12 Claims, 22 Drawing Sheets

(51) Int. Cl.
| | | |
|---|---|---|
| *G02B 21/36* | (2006.01) | |
| *H04N 5/225* | (2006.01) | |
| *G02B 21/24* | (2006.01) | |
| *H04N 5/235* | (2006.01) | |
| *G06T 5/00* | (2006.01) | |
| *G06T 5/50* | (2006.01) | |

(52) U.S. Cl.
CPC ........... *G02B 21/36* (2013.01); *G02B 21/367* (2013.01); *G06T 5/003* (2013.01); *G06T 5/50* (2013.01); *H04N 5/225* (2013.01); *H04N 5/2256* (2013.01); *H04N 5/232* (2013.01); *H04N 5/2354* (2013.01); *G06T 2207/10024* (2013.01); *G06T 2207/10056* (2013.01); *G06T 2207/10152* (2013.01); *G06T 2207/20221* (2013.01); *H04N 5/23293* (2013.01)

(56) References Cited

FOREIGN PATENT DOCUMENTS

| | | | |
|---|---|---|---|
| JP | 2012-230401 A | 11/2012 | |
| WO | WO 2013183438 | * 12/2013 | ............. G02B 21/06 |

OTHER PUBLICATIONS

International Preliminary Report on Patentability and English translation thereof dated Nov. 24, 2016 in connection with International Application No. PCT/JP2015/002009.

* cited by examiner

IMAGE PROCESSING APPARATUS, IMAGE PROCESSING PROGRAM, IMAGE PROCESSING METHOD, MICROSCOPIC SYSTEM

CROSS REFERENCE TO RELATED APPLICATIONS

This is a U.S. National Stage Application under 35 U.S.C. § 371, based on International Application No. PCT/JP2015/002009, filed Apr. 9, 2015, which claims priority to Japanese Patent Application JP 2014-100757, filed May 14, 2014, each of which is hereby incorporated by reference in its entirety.

TECHNICAL FIELD

The present technology relates to an image processing apparatus, an image processing program, and an image processing method that perform image processing on an image picked up via a microscope optical system, and to a microscopic system that picks up an image as an image processing target.

BACKGROUND ART

A microscopic image obtained by picking up an image of an observation target object via a microscope is desired to have a high resolution. However, the NA (numerical aperture) of the microscope optical system is very large, and it is technically difficult to eliminate the chromatic aberration (focus deviation due to the wavelength band). Further, also from the view point of the cost, size, and the like of the microscope optical system, there is a limit to improve the resolution of a picked-up image optically.

For example, in the field of video technology, a technology that performs image processing on a picked-up image to acquire an image with a resolution higher than that of the image actually picked up (super-resolution technology) is widely used. However, for use in scientific verification, it is inappropriate to resolve, by image processing, those cannot be optically resolved.

For example, in Patent Document 1, an image processing apparatus that superimposes a plurality of images one on another and combines them with each other to obtain a combined image is described. This apparatus is assumed to generate a combined image (panorama image) from images picked up by an imaging apparatus such as a camera, and is not used for scientific verification such as a microscopic image.

Patent Document 1: Japanese Patent No. 4814840

SUMMARY

Problem to be Solved

As described above, in order to acquire a high-resolution image that is available for scientific verification, it needs to improve the optical resolution performance of the microscope optical system.

In view of the circumstances as described above, it is an object of the present technology to provide an image processing apparatus, an image processing program, an image processing method, and a microscopic system that are capable of acquiring a high-resolution image that is suitable for scientific verification.

Means for Solving the Problem

In order to achieve the above-mentioned object, an image processing apparatus according to an embodiment of the present technology includes an image conversion unit and an image generation unit.

The image conversion unit converts a first picked-up image and a second picked-up image into frequency components, the first picked-up image being obtained by picking up an image of an observation target object with first illumination light via a microscope optical system, the second picked-up image being obtained by picking up an image of the observation target object with second illumination light via the microscope optical system, the second picked-up image having a contrast in a low frequency band lower than that of the first picked-up image and a contrast in a high frequency band higher than that of the first picked-up image.

The image generation unit combines a low frequency component of the first picked-up image and a high frequency component of the second picked-up image with each other to generate a composite image.

With this configuration, the image processing apparatus is capable of generating a high-resolution image that includes a low frequency component of the first picked-up image having a high contrast in the low frequency component and a high frequency component of the second picked-up image having a high contrast in the high frequency band, and has a high contrast in all frequency bands. The low frequency component of the first picked-up image and the high frequency component of the second picked-up image are those optically resolved with the microscope optical system, and the composite image is suitable for scientific verification. Specifically, according to the above-mentioned configuration, it is possible to acquire a high-resolution image that is suitable for scientific verification.

The first illumination light may be narrow band light in a wavelength band longer than that of the second illumination light, and the second illumination light may be narrow band light in a wavelength band shorter than that of the first illumination light.

When white light including components in a plurality of wavelength bands is used as the illumination light, the focal position of the microscope optical system is slightly displaced for each wavelength band and does not completely match. On the other hand, when narrow band light is used as the illumination light, the focal position of the microscope optical system completely matches, and it is possible to acquire resolution performance higher than that of white light. Here, depending on the magnification of the microscope, the wavelength band of illumination light from which the highest contrast can be acquired is different for the spatial frequency of the observation target object, the contrast of the low frequency band is high in the case of illumination light in a long frequency band, and the contrast of the high frequency band is high in the case of illumination light in a short frequency band. Therefore, the first picked-up image having a high contrast in the low frequency band can be acquired by picking up an image of the observation target object with the first illumination light that is narrow band light in a long wavelength band, and the second picked-up image having a high contrast in the high frequency band can be acquired by picking up an image of the observation target object with the second illumination light that is narrow band light in a short wavelength band. As described above, according to the present technology, because a high resolution image having a high contrast in all frequency bands can be generated from the low frequency component of the first picked-up image and the high frequency component of the second picked-up image, it is possible to pick up the first picked-up image and the second picked-up image that can be used for generating a high-resolution image by using two kinds of narrow band light having different wavelength bands as the illumination light.

The first illumination light may be red light, and the second illumination light may be blue light.

Red light and blue light are the farthest away from each other in the wavelength band of visible light, and the difference of frequency properties between them is large. Specifically, in the case where the magnification of the microscope optical system is equal to or larger than a predetermined magnification, the contrast in the low frequency band of the red light tends to be high and the contrast in the high frequency band of the blue light tends to be high. Therefore, by using the red light as the first illumination light and the blue light as the second illumination light, more significant effects can be acquired as compared with the case where narrow band light in two wavelength bands more close to each other is used as the first illumination light and the second illumination light.

The first illumination light may have an illumination NA lower than that of the second illumination light, and the second illumination light may have an illumination NA higher than that of the first illumination light.

Also for the NA (illumination NA) of illumination light, the tendency of the contrast for the frequency band is different. Specifically, illumination light having a low illumination NA has a high contrast in the low frequency band, and illumination light having a high illumination NA has a high contrast in the high frequency band. Therefore, also by using illumination light having a low illumination NA as the first illumination light and illumination light having a high illumination NA as the second illumination light, it is possible to generate the first picked-up image having a high contrast in the low frequency band and the second picked-up image having a high contrast in the high frequency band.

The image conversion unit may convert the first picked-up image into a spatial frequency area image to generate a first spatial frequency area image, and the second picked-up image into a spatial frequency area image to generate a second spatial frequency area image, and the image generation unit may generate the composite image from a low frequency area of the first spatial frequency area image and a high frequency area of the second spatial frequency area image.

With this configuration, by converting (e.g., Fourier transform) the first picked-up image and the second picked-up image into a spatial frequency area image, it is possible to treat the low frequency component of the first picked-up image and the high frequency component of the second picked-up image as a low frequency area and a high frequency area, respectively.

The image generation unit may generate a combined image obtained by combining the low frequency area and the high frequency area with each other, and generate the composite image by converting the combined image into a spatial area image.

With this configuration, because the low frequency component of the first picked-up image (the low frequency area of the first spatial frequency area image) and the high frequency component of the second picked-up image (the high frequency area of the second spatial frequency area image) can be combined with each other at the stage of the spatial frequency area image, it is possible to generate a composite image including the low frequency component of the first picked-up image and the high frequency component of the second picked-up image by converting (e.g., inverse Fourier transform) it into a spatial area.

The image generation unit may generate a low frequency component image obtained by converting the low frequency area into a spatial area image and a high frequency component image obtained by converting the high frequency area into a spatial area image, and generate the composite image by adding the low frequency component image and the high frequency component image to each other.

With this configuration, because a low frequency component image including the low frequency component of the first picked-up image (the low frequency area of the first spatial frequency area image) and a high frequency component image including the high frequency component of the second picked-up image (the high frequency area of the second spatial frequency area image) can be generated, it is possible to generate a composite image including the low frequency component of the first picked-up image and the high frequency component of the second picked-up image at the stage of the spatial area image by adding them to each other.

In order to achieve the above-mentioned object, an image processing program according to an embodiment of the present technology includes an image conversion unit and an image generation unit. The image conversion unit converts a first picked-up image and a second picked-up image into frequency components, the first picked-up image being obtained by picking up an image of an observation target object with first illumination light via a microscope optical system, the second picked-up image being obtained by picking up an image of the observation target object with second illumination light via the microscope optical system, the second picked-up image having a contrast in a low frequency band lower than that of the first picked-up image and a contrast in a high frequency band higher than that of the first picked-up image.

The image generation unit combines a low frequency component of the first picked-up image and a high frequency component of the second picked-up image with each other to generate a composite image.

With this configuration, as described above, it is possible to acquire a high-resolution image that is suitable for scientific verification.

In order to achieve the above-mentioned object, an image processing method according to an embodiment of the present technology includes converting, by an image conversion unit, a first picked-up image and a second picked-up image into frequency components, the first picked-up image being obtained by picking up an image of an observation target object with first illumination light via a microscope optical system, the second picked-up image being obtained by picking up an image of the observation target object with second illumination light via the microscope optical system, the second picked-up image having a contrast in a low frequency band lower than that of the first picked-up image and a contrast in a high frequency band higher than that of the first picked-up image.

An image generation unit combines a low frequency component of the first picked-up image and a high frequency component of the second picked-up image with each other to generate a composite image.

With this configuration, as described above, it is possible to acquire a high-resolution image that is suitable for scientific verification.

In order to achieve the above-mentioned object, a microscopic system according to an embodiment of the present technology includes an illumination lamp, a microscope optical system, an imaging unit, and an image conversion unit.

The illumination lamp applies first illumination light and second illumination light.

The image conversion unit converts a first picked-up image and a second picked-up image into frequency components, the first picked-up image being obtained by picking up an image of an observation target object with the first illumination light via the microscope optical system, the second picked-up image being obtained by picking up an image of the observation target object with the second illumination light via the microscope optical system, the second picked-up image having a contrast in a low frequency band lower than that of the first picked-up image and a contrast in a high frequency band higher than that of the first picked-up image.

The image generation unit combines a low frequency component of the first picked-up image and a high frequency component of the second picked-up image with each other to generate a composite image.

With this configuration, it is possible to pick up the first picked-up image having a high contrast in the low frequency band under irradiation of the first illumination light, and the second picked-up image having a high contrast in the high frequency band under irradiation of the second illumination light. The image processing apparatus is capable of generating the composite image that is a high-resolution image from the first picked-up image and the second picked-up image as described above.

The microscopic system may further including: a focus adjustment mechanism that adjust a focal position of the microscope optical system; and a control unit that controls the focus adjustment mechanism to cause the microscope optical system to focus on the observation target object under irradiation of the first illumination light, and cause the microscope optical system to focus on the observation target object under irradiation of the second illumination light.

With this configuration, because the control unit adjusts the focal position under irradiation of the first illumination light and under the second illumination light, it is possible to improve the contrast of the first picked-up image and the second picked-up image, i.e., the contrast of the composite image.

The microscopic system may further including a control unit that controls a light amount of the first illumination light and the second illumination light so that exposure of the first picked-up image and exposure of the second picked-up image match.

With this configuration, because the contrast of the first picked-up image and the contrast of the second picked-up image are similar to each other, it is possible to suppress the imbalance of the contrast between the low frequency component in the composite image (derived from the first picked-up image) and the high frequency component (derived from the second picked-up image).

Effects

As described above, according to the present technology, it is possible to provide an image processing apparatus, an image processing program, an image processing method, and a microscopic system that are capable of acquiring a high-resolution image that is suitable for scientific verification. Note that the effect described here is not necessarily limitative and may be any effect described in the present disclosure.

DESCRIPTION OF PREFERRED EMBODIMENTS

First Embodiment

A microscopic system 100 according to a first embodiment of the present technology will be described.

<Configuration of Microscopic System>

Figure 1:
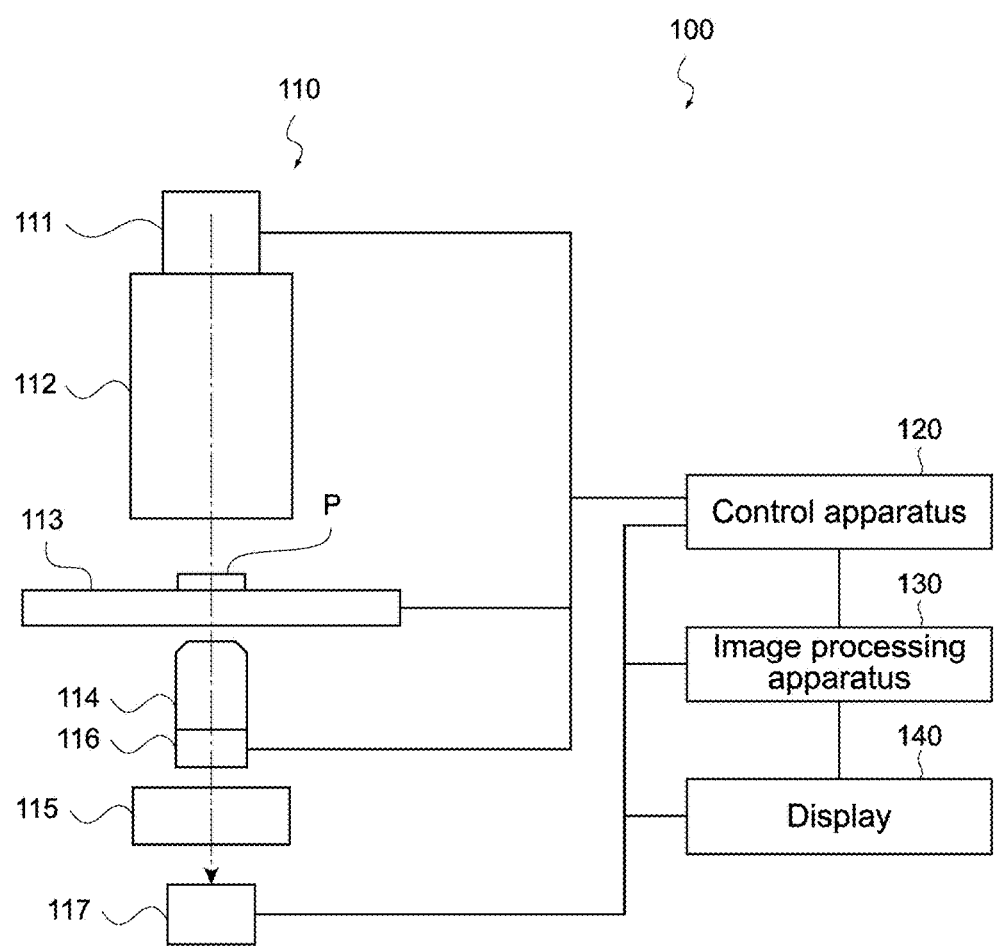
FIG. 1 A schematic diagram of a microscopic system according to a first embodiment of the present technology.

FIG. 1 is a schematic diagram showing the configuration of the microscopic system 100 according to this embodiment. As shown in FIG. 1, the microscopic system 100 includes a microscope 110, a control apparatus 120, an image processing apparatus 130, and a display 140. On the microscope 110, an observation target object P is placed.

The microscope 110 generates an enlarged microscopic image of the observation target object P. As shown in FIG. 1, the microscope 110 includes an illumination lamp 111, an illumination optical system 112, a stage 113, an objective lens 114, an imaging lens 115, a focus adjustment mechanism 116, and an imaging unit 117. Note that in the following description, a direction along the optical axis of the microscope 110 is a Z direction, one direction perpendicular to the Z direction is an X direction, and a direction perpendicular to the Z direction and the X direction is a Y direction.

Figure 2:
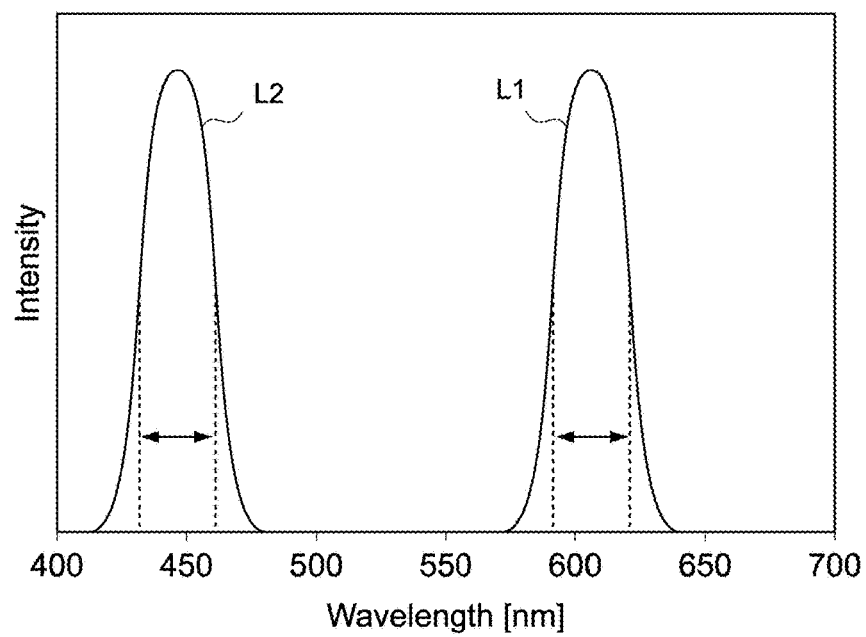
FIG. 2 A diagram showing the spectra of first illumination light and second illumination light applied from an illumination lamp in the microscopic system.

The illumination lamp 111 applies illumination light to the observation target object P. Here, the illumination lamp 111 is configured to be capable of applying two kinds of illumination light. The two kinds of illumination light applied by the illumination lamp 111 are referred to as a first illumination light L1 and a second illumination light L2. FIG. 2 is a schematic diagram showing an example of the spectra of the first illumination light L1 and the second illumination light L2.

Assumption is made that the first illumination light L1 is narrow band light having a wavelength band longer than that of the second illumination light L2. For example, the wavelength band of the first illumination light L1 is included in the red light band of not less than 570 nm and not more than 700 nm. Note that the first illumination light L1 may have at least the peak wavelength in the red light band. The first illumination light L1 can be narrow band light having a full width at half maximum of the spectrum (width shown by dashed lines in the figure) of not less than 10 nm and not more than 100 nm.

Assumption is made that the second illumination light L2 is narrow band light having a wavelength band shorter than that of the first illumination light. For example, the wavelength band of the second illumination light is included in the blue light band of not less than 400 nm and not more than 500 nm. Note that the second illumination light L2 may have at least the peak wavelength in the blue light band. The second illumination light L2 can be narrow band light having a full width at half maximum of the spectrum (width shown by dashed lines in the figure) of not less than 10 nm and not more than 100 nm.

The wavelength bands of the first illumination light L1 and the second illumination light L2 are not limited to those described above as long as the wavelength band of the first illumination light L1 is longer than that of the second illumination light L2 and the wavelength band of the second illumination light L2 is shorter than that of the first illumination light L1. For example, the second illumination light L2 may be in the green light band (not less than 500 nm and not more than 570 nm). However, if the wavelength of the first illumination light L1 is close to the wavelength band of the second illumination light L2, the effects of the present technology are reduced. Therefore, the wavelength bands are favorably apart from each other to some extent.

In the above, the first illumination light L1 and the second illumination light L2 are each favorably narrow band light having a full width at half maximum of the spectrum of not less than 10 nm and not more than 100 nm. This is because the resolution of a picked-up image under the illumination light is reduced when the full width at half maximum exceeds 100 nm. Because the refractive index of light is slightly different for each wavelength band, the focal position is displaced for each wavelength, and it is difficult to strictly bring the light in all wavelengths into focus on the same position when a full width at half maximum exceeds 100 nm. On the other hand, if the full width at half maximum is less than 10 nm, interference is generated in the observation target object P. Therefore, the full width at half maximum is favorably not less than 10 nm.

In the following, description will be made with the first illumination light L1 and the second illumination light L2 as being included in the red wavelength band and the blue wavelength band, respectively.

The illumination lamp 111 is configured to be capable of separately applying the first illumination light L1 and the second illumination light L2. Specifically, the illumination lamp 111 may include a light source for the first illumination light L1 and a light source for the second illumination light L2. As the light source, an LED (Light Emitting Diode), a laser, and the like, which have a relatively narrow wavelength band of emitted light, can be used. Alternatively, the illumination lamp 111 may be a single light source, and may be configured to be capable of applying the first illumination light L1 and the second illumination light L2 by using a switchable color filter or the like.

The illumination optical system 112 collimates the first illumination light L1 and the second illumination light L2 applied from the illumination lamp 111. The illumination optical system 112 is, for example, a Kohler illumination optical system.

The stage 113 supports the observation target object P. The stage 113 is, for example, an XY stage that can be moved to the X direction and the Y direction, or an XYZ stage that can be moved to the X direction, the Y direction, and the Z direction.

The objective lens 114 optically enlarges an image of the observation target object P. The image of the observation target object P is formed by the first illumination light L1 or the second illumination light L2 applied to the observation target object. The objective lens 114 has, for example, a general configuration.

The imaging lens 115 forms an image of the observation target object P enlarged by the objective lens 114 on the imaging surface of the imaging unit 117. The imaging lens 115 has, for example, a general configuration.

The objective lens 114 and the imaging lens 115 constitute the microscope optical system of the microscope 110. Note that the configuration of the microscope optical system is not limited to that described here, and it only has to enlarge the image of the observation target object P and form an image on the imaging surface of the imaging unit 117.

The focus adjustment mechanism 116 adjusts the focal position of the microscope optical system. Specifically, as shown in FIG. 1, the focus adjustment mechanism 116 can adjust the focal position by moving the Z position of the objective lens 114. Further, the focus adjustment mechanism 116 may be incorporated in the stage 113 and adjust the focal position by moving the Z position of the stage 113. The focus adjustment mechanism 116 can adjust the focal position under control of the control apparatus 120. This will be described later.

The imaging unit 117 picks up an image of the observation target object P formed by the imaging lens 115. The imaging unit 117 includes a solid-state image sensor such as a CCD (Charge Coupled Device) and a CMOS (Complementary Metal-Oxide Semiconductor). Here, the imaging unit 117 only has to be capable of picking up an image of (photoelectrically converting) at least light in the wavelength bands of the first illumination light L1 and the second illumination light L2, and may include a general image sensor that can perform color imaging.

The microscope 110 has the above-mentioned configuration. Note that although the microscope 110 has been shown as a transmission bright field microscope in FIG. 1, the present technology can be applied to any kind of microscope that is capable of optically enlarging the image of the observation target object such as a reflection bright field microscope, a phase-contrast microscope, and a fluorescence microscope.

The control apparatus 120 controls the respective units of the microscope 110. As shown in FIG. 1, the control apparatus 120 can be connected to the illumination lamp 111, the stage 113, and the focus adjustment mechanism 116, and control them. The control apparatus 120 can control the light amount of the first illumination light L1 and the second illumination light L2 applied from the illumination lamp 111 or the focal position of the microscope optical system although the details will be described later.

Figure 3:
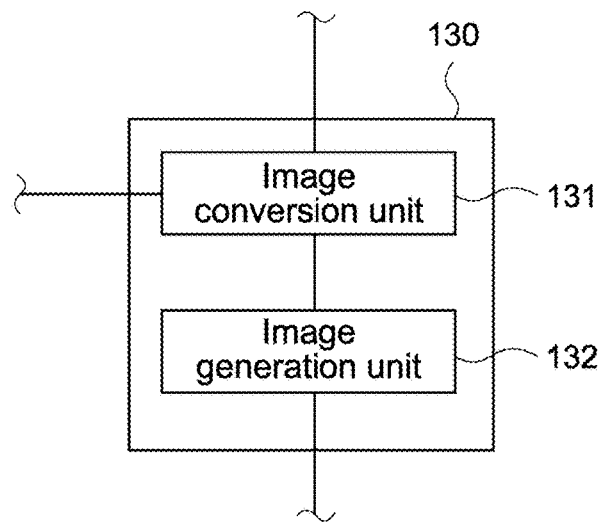
FIG. 3 A schematic diagram showing the functional configuration of an image processing apparatus in the microscopic system.

The image processing apparatus 130 performs image processing on the image picked up by the imaging unit 117. FIG. 3 is a schematic diagram showing the functional configuration of the image processing apparatus 130, and FIG. 4 is a schematic diagram showing a typical hardware configuration of the image processing apparatus 130.

As shown in FIG. 3, the image processing apparatus 130 includes an image conversion unit 131 and an image generation unit 132. Description of the configurations of the image conversion unit 131 and the image generation unit 132 will be made in detail along with description of the operation of the microscopic system 100. The image conversion unit 131 and the image generation unit 132 have the functional configuration achieved by cooperation of the hardware configuration shown in FIG. 4 with a program.

Figure 4:
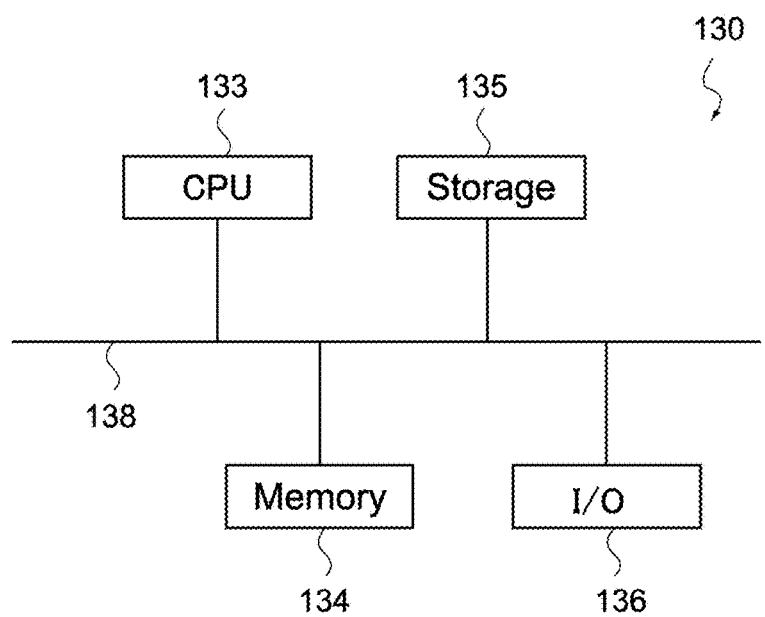
FIG. 4 A schematic diagram showing the hardware configuration of the image processing apparatus in the microscopic system.

As shown in FIG. 4, the image processing apparatus 130 includes, as a hardware configuration, a CPU 133, a memory 134, a storage 135, and an input/output unit 136. These are connected to each other via a bus 138.

The CPU (Central Processing Unit) 133 controls another configuration in accordance with a program stored in the memory 134, performs data processing in accordance with the program, and stores the processing results in the memory 134. The CPU 133 can be a microprocessor.

The memory 134 stores a program executed by the CPU 133 and data. The memory 134 can be a RAM (Random Access Memory).

The storage 135 stores a program or data. The storage 135 can be an HDD (Hard disk drive) or an SSD (solid state drive).

The input/output unit 136 receives an input to the image processing apparatus 130, and supplies an output of the image processing apparatus 130 to the outside. The input/output unit 136 includes an input device such as a keyboard and a mouse, an output device such as the display 140, and a connection interface such as a network.

The hardware configuration of the image processing apparatus 130 is not limited to that described here, and it only has to achieve the above-mentioned functional configuration of the image processing apparatus 130. Further, a part or whole of the above-mentioned hardware configuration may be on a network.

The display 140 is connected to the input/output unit 136 of the image processing apparatus 130, and displays an image output from the image processing apparatus 130. Further, the display 140 may be connected also to the imaging unit 117 of the microscope 110, and may directly display an image picked up by the imaging unit 117.

The microscopic system 100 has the above-mentioned configuration. Note that the control apparatus 120 and the image processing apparatus 130 may be one apparatus having the functions thereof. Further, one or both of the control apparatus 120 and the image processing apparatus 130 may be mounted on the microscope 110.

<Operation of Microscopic System>

Figure 5:
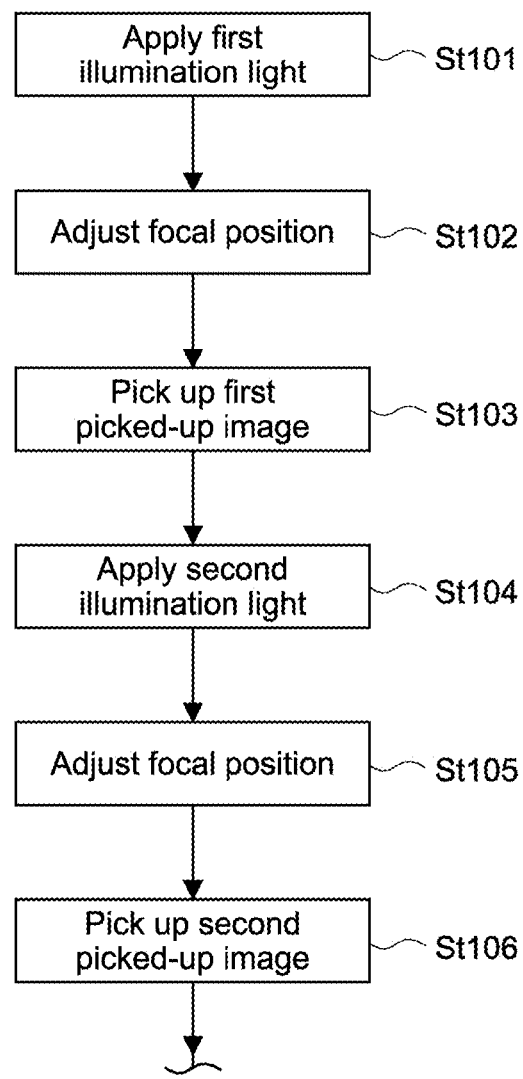
FIG. 5 A flowchart showing the operation of the microscopic system.
Figure 6:
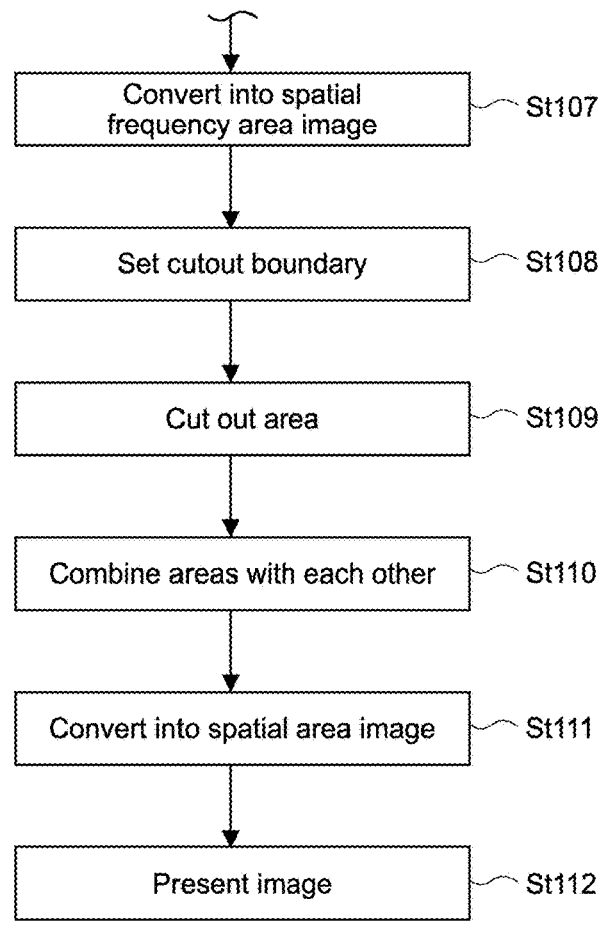
FIG. 6 A flowchart showing the operation of the microscopic system.

The operation of the microscopic system 100 will be described. FIGS. 5 and 6 are each a flowchart showing the operation of the microscopic system 100.

First, the control apparatus 120 controls the illumination lamp 111, and the first illumination light L1 is applied from the illumination lamp 111 (St101). As described above, the first illumination light L1 is narrow band light in a long wavelength band. The first illumination light L1 is collimated by the illumination optical system 112, transmitted through the observation target object P, and enlarged by the objective lens 114, and an image thereof is formed on the imaging surface of the imaging unit 117 by the imaging lens 115.

Next, the control apparatus 120 controls the focus adjustment mechanism 116 to adjust the focal position of the microscope optical system (the objective lens 114 and the imaging lens 115) (St102). The control apparatus 120 is capable of controlling the focus adjustment mechanism 116 to adjust the focal position such that the contrast of an image picked up by the imaging unit 117 is maximized.

Further, in the case where an image has been picked up with illumination light of white light (normal bright field image) in advance, the control apparatus 120 may set the focal position to a position displaced by a predetermined amount from the focal position at that time. For example, the control apparatus 120 is capable of determining the shift amount of the focal position depending on the wavelength band of the first illumination light L1 by measuring or calculating in advance how much the focal position is displaced with light in a particular wavelength band with respect to the focal position with white light.

Further, the user may operate the control apparatus 120 while referring to a picked-up image displayed on the display 140 such that the contrast of the picked-up image is maximized, to perform the adjustment of the focal position manually.

Figure 7:
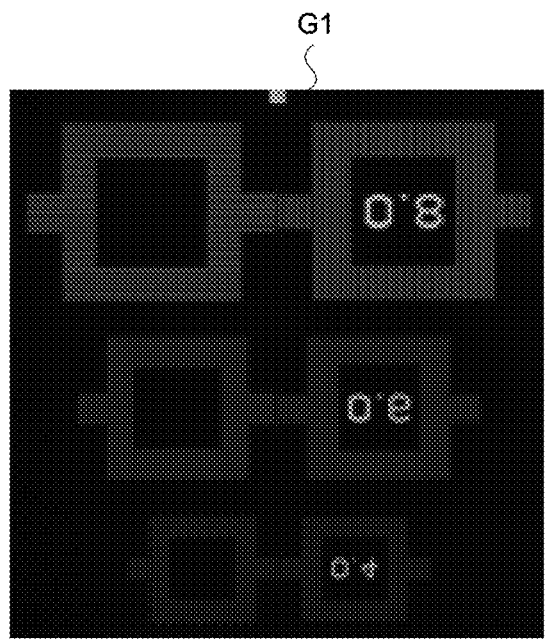
FIG. 7 A diagram showing an example of a first picked-up image picked up by the microscopic system.

When the adjustment of the focal position under irradiation of the first illumination light L1 is completed, the control apparatus 120 controls the imaging unit 117 to pick up an image (St103). Hereinafter, this picked up image is referred to as a first picked-up image G1. FIG. 7 shows an example of the first picked-up image G1. Because this image has been obtained by picking up an image of a resolving power chart including lines having a predetermined width and space (example of the observation target object P), and has been picked up in the wavelength band of the first illumination light L1 (red wavelength band), the white area of the image shown in FIG. 7 is actually red. The imaging unit 117 supplies the first picked-up image G1 to the image processing apparatus 130.

Next, the control apparatus 120 controls the illumination lamp 111 to apply the second illumination light L2 from the illumination lamp 111 (St104). As described above, the first illumination light L1 is narrow band light in a short wavelength band. The second illumination light L2 is collimated by the illumination optical system 112, transmitted through the observation target object P, and enlarged by the objective lens 114, and an image thereof is formed on the imaging surface of the imaging unit 117 by the imaging lens 115.

Next, the control apparatus 120 controls the focus adjustment mechanism 116 to adjust the focal position of the microscope optical system (the objective lens 114 and the imaging lens 115) (St105). Since the wavelength bands of the first illumination light L1 and the second illumination light L2 are slightly different from each other, their focal positions are slightly different from each other. By adjusting the focal position again, it is possible to improve the resolution of the picked-up image under irradiation of the second illumination light L2.

Similarly to the case of the first illumination light L1, the control apparatus 120 is capable of controlling the focus adjustment mechanism 116 to adjust the focal position such that the contrast of the image picked up by the imaging unit 117 is maximized. Further, the control apparatus 120 may displace the focal position by a predetermined amount from the focal position adjusted at the time of the first illumination light L1 depending on the wavelength band of the second illumination light L2. Further, the user may adjust the focal position manually.

Figure 8:
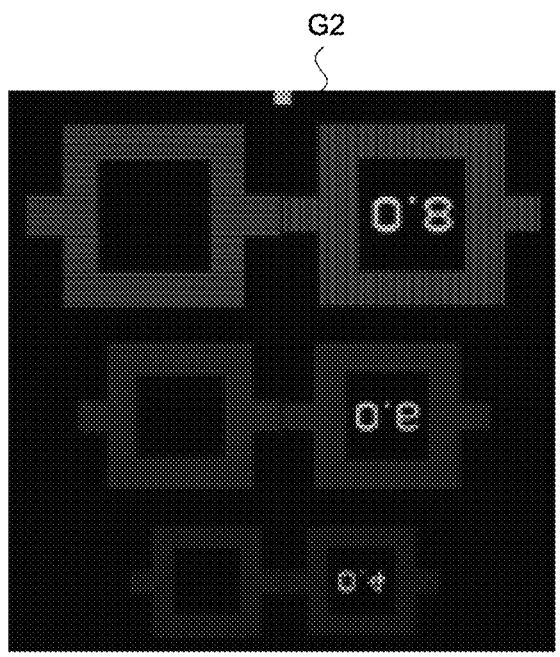
FIG. 8 A diagram showing an example of a second picked-up image picked up by the microscopic system.

When the adjustment of the focal position under irradiation of the second illumination light L2 is completed, the control apparatus 120 controls the imaging unit 117 to pick up an image (St106). Hereinafter, this picked up image is referred to as a second picked-up image G2. FIG. 8 shows an example of the second picked-up image G2. Because this image has been obtained by picking up an image of a resolving power chart (example of the observation target object P) as described above, and has been picked up in the wavelength band of the second illumination light L2 (blue wavelength band), the white area of the image shown in FIG. 8 is actually blue. The imaging unit 117 supplies the second picked-up image G2 to the image processing apparatus 130.

In this way, the first picked-up image G1 is picked up under irradiation of the first illumination light L1, and the second picked-up image G2 is picked up under irradiation of the second illumination light L2. Note that the pick-up order of the first picked-up image G1 and the second picked-up image G2 may be reversed.

Further, when the first picked-up image G1 and the second picked-up image G2 are picked up, the control apparatus 120 may control the illumination lamp 111 to adjust the light amount of the first illumination light L1 and the second illumination light L2. This is because when brightness (exposure) of the first illumination light L1 and the second illumination light L2 significantly differs, a problem occurs in image processing to be described later. Specifically, the control apparatus 120 can control the illumination lamp 111 such that the average brightness value of the picked-up image under irradiation of the first illumination light L1 and the average brightness value of the picked-up image under irradiation of the second illumination light L2 match.

Next, as shown in FIG. 6, the image conversion unit 131 converts the first picked-up image G1 and the second picked-up image G2 into a spatial frequency area image (St107). The first picked-up image G1 and the second picked-up image G2 are each obtained by picking up an image of the observation target object P and are each a spatial area image. The image conversion unit 131 can perform frequency analysis on the first picked-up image G1 and the second picked-up image G2, and convert the first picked-up image G1 into the first spatial frequency area image and the second picked-up image G2 into the second spatial frequency area image.

Specifically, by applying the Fourier transform to the first picked-up image G1 and the second picked-up image G2, decomposing them into frequency components, and arranging them in predetermined coordinates, the image conversion unit 131 can convert both picked-up images into a spatial frequency area image. For the Fourier transform, fast Fourier transform (FFT) can be used. Further, the image conversion unit 131 may use another frequency analysis algorithm to convert the first picked-up image G1 and the second picked-up image G2 into a spatial frequency area image.

The image conversion unit 131 can decompose the first picked-up image G1 and the second picked-up image G2 into frequency components, and arrange the frequency components such that a low frequency component is arranged on the center of the image and a high frequency component is arranged on the edge of the image, thereby generating a spatial frequency area image.

Figure 9:
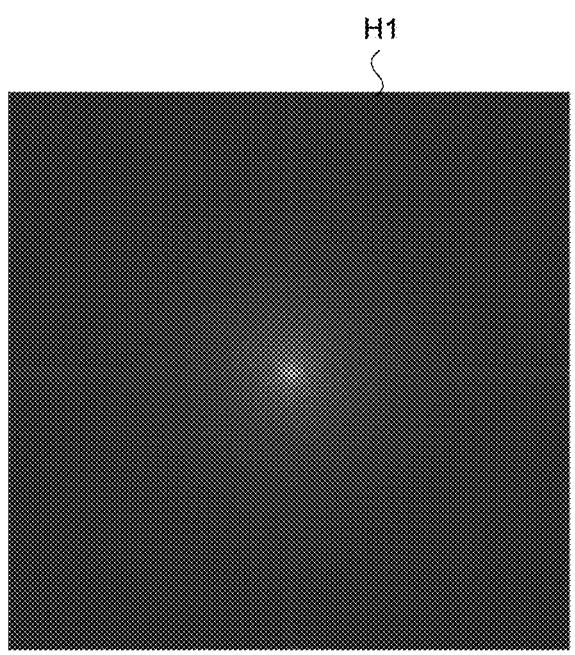
FIG. 9 A diagram showing an example of a first spatial frequency area image generated by an image conversion unit in the microscopic system.
Figure 10:
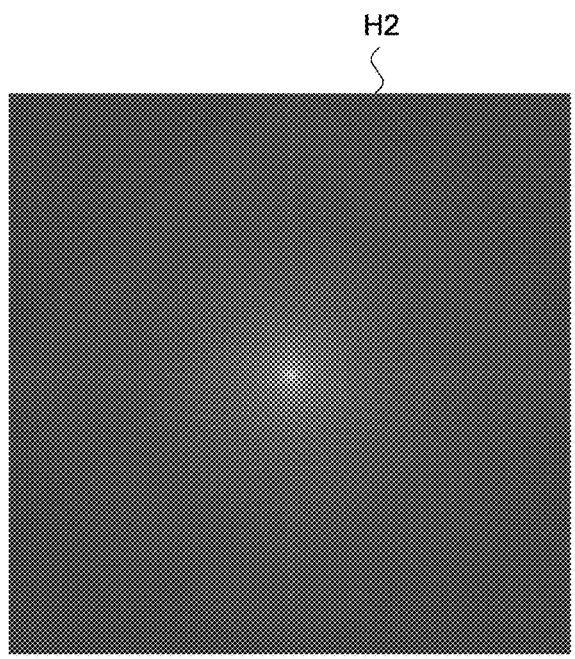
FIG. 10 A diagram showing an example of a second spatial frequency area image generated by the image conversion unit in the microscopic system.

FIG. 9 shows a first spatial frequency area image H1 converted from the first picked-up image G1, and FIG. 10 shows a second spatial frequency area image H2 generated from the second picked-up image G2. FIGS. 9 and 10 show images that are obtained by applying the fast Fourier transform to the first picked-up image G1 and the second picked-up image G2, respectively, and generated such that a low frequency component is arranged on the center of the image and a high frequency component is arranged on the edge of the image.

Figure 11:
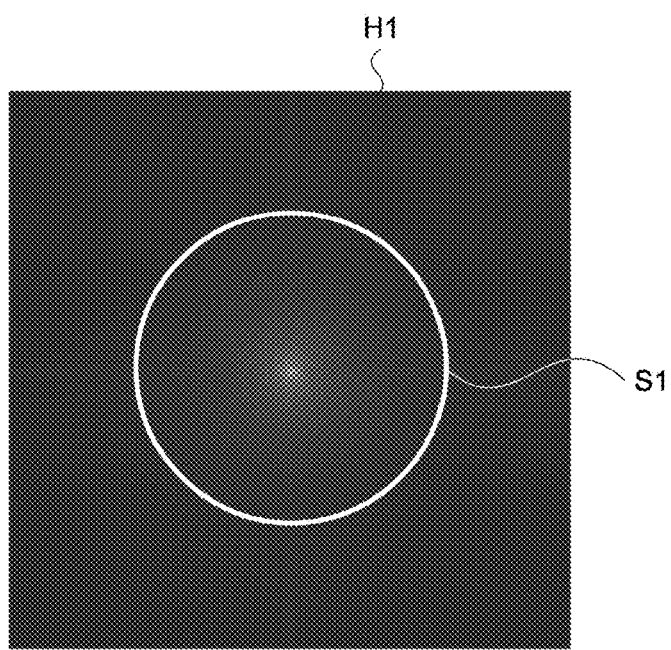
FIG. 11 A schematic diagram showing a cutout boundary set for the first spatial frequency area image by the image generation unit in the microscopic system.
Figure 12:
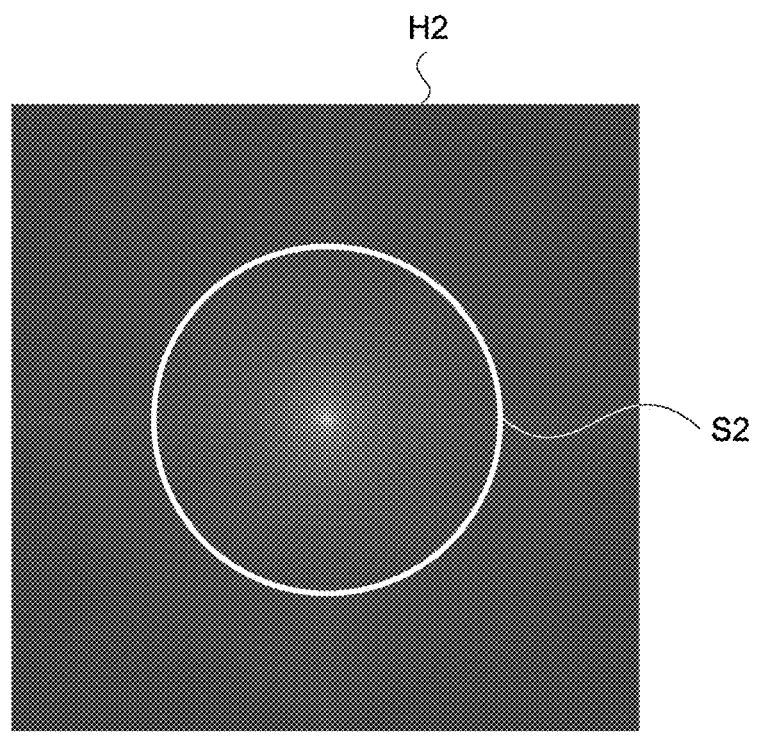
FIG. 12 A schematic diagram showing a cutout boundary set for the second spatial frequency area image by the image generation unit in the microscopic system.

Next, the image generation unit 132 sets a cutout boundary for the first spatial frequency area image H1 and the second spatial frequency area image H2 (St108). FIG. 11 is a diagram showing a cutout boundary S1 set for the first spatial frequency area image H1, and FIG. 12 is a diagram showing a cutout boundary S2 set for the second spatial frequency area image H2.

As shown in the figures, the image generation unit 132 can set, as the cutout boundary S1 and the cutout boundary S2, a circle with the same diameter around the image center in both of the spatial frequency area images. The distance from the image center in both of the spatial frequency area images is a frequency, and a circle around the center of the image corresponds to a particular frequency. This frequency may be determined in advance. Alternatively, the image generation unit 132 may determine the frequency by analyzing the first spatial frequency area image H1 and the second spatial frequency area image H2. However, the frequency is favorably a frequency that is the same as or close to a reverse frequency to be described later.

Further, the cutout boundary does not necessarily need to have a circular shape, and may have a rectangular shape or elliptical shape around the center of the image. However, as described above, a circle around the center of a spatial frequency area image corresponds to a particular frequency, and thus is used favorably.

Figure 13:
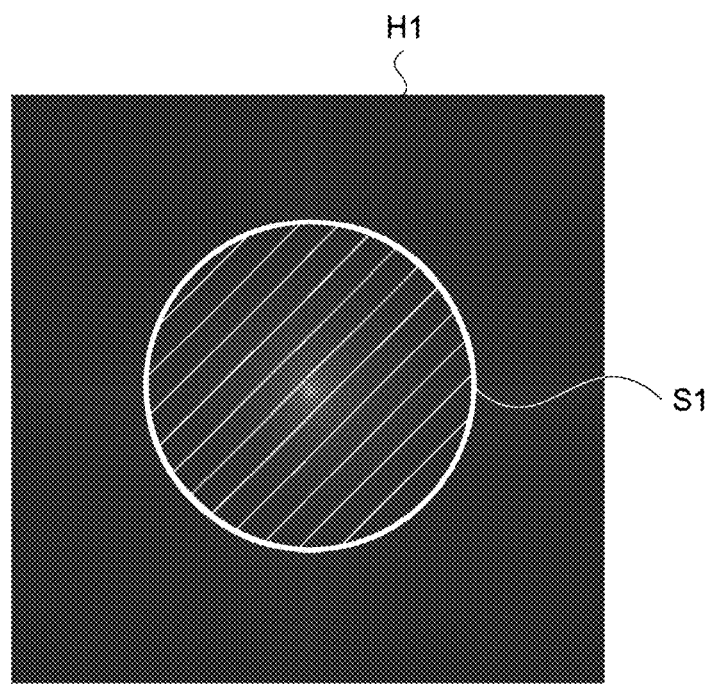
FIG. 13 A conceptual diagram showing cutting out of a low frequency area by the image generation unit in the microscopic system.
Figure 13:
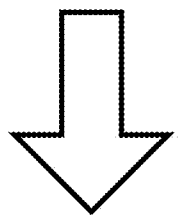
Figure 13:
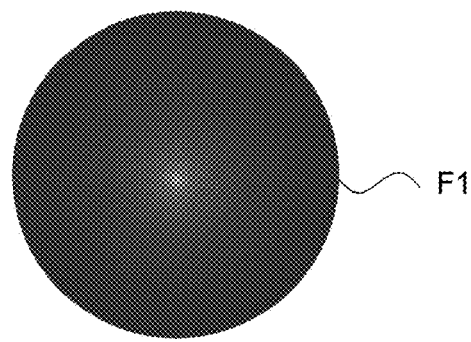

Next, the image generation unit 132 cuts out a low frequency area from the first spatial frequency area image H1, and a high frequency area from the second spatial frequency area image H2 (St109). FIG. 13 is a conceptual diagram showing cutting out of a low frequency area from the first spatial frequency area image H1. As shown in the figure, the image generation unit 132 can cut out an inner peripheral area (area shown by a diagonal line) of the cutout boundary S1 in the first spatial frequency area image H1. Because the center of the first spatial frequency area image H1 is a low frequency component as described above, the inner peripheral area of the cutout boundary S is an area of a low frequency component. Hereinafter, this area will be described as a low frequency area F1.

Figure 14:
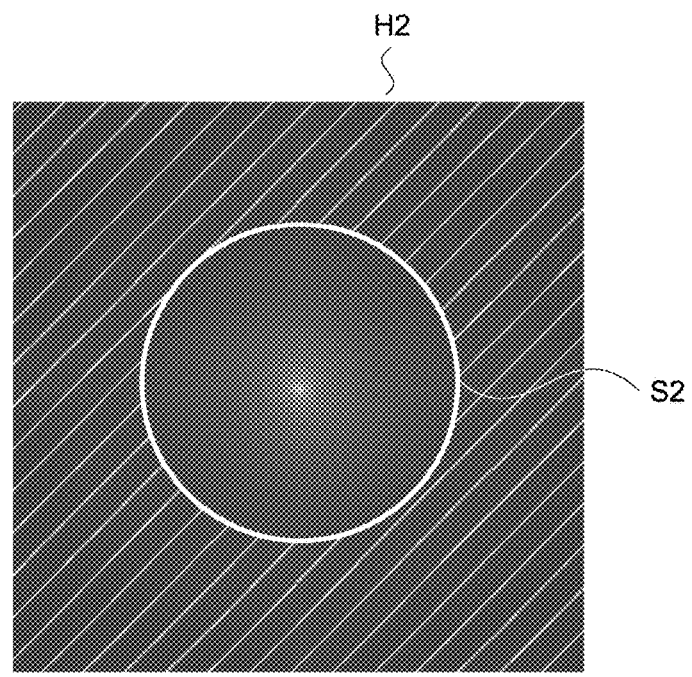
FIG. 14 A conceptual diagram showing cutting out of a high frequency area by the image generation unit in the microscopic system.
Figure 14:
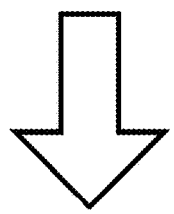
Figure 14:
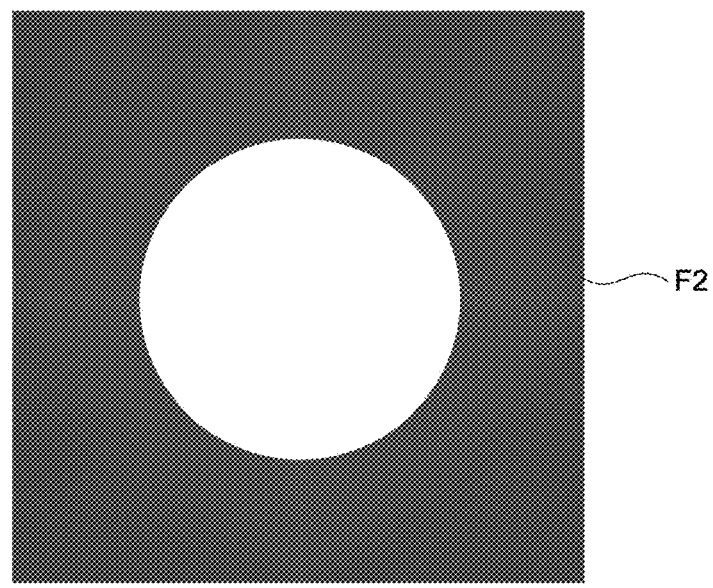

FIG. 14 is a conceptual diagram showing cutting out of a high frequency area from the second spatial frequency area image H2. As shown in the figure, the image generation unit 132 can cut out an outer peripheral area (area shown by a diagonal line) of the cutout boundary S2 in the second spatial frequency area image H2. Because also the center of the second spatial frequency area image H2 is a low frequency component as described above, the outer peripheral area of the cutout boundary S2 is an area of a high frequency component. Hereinafter, this area will be described as a high frequency area F2.

Figure 15:
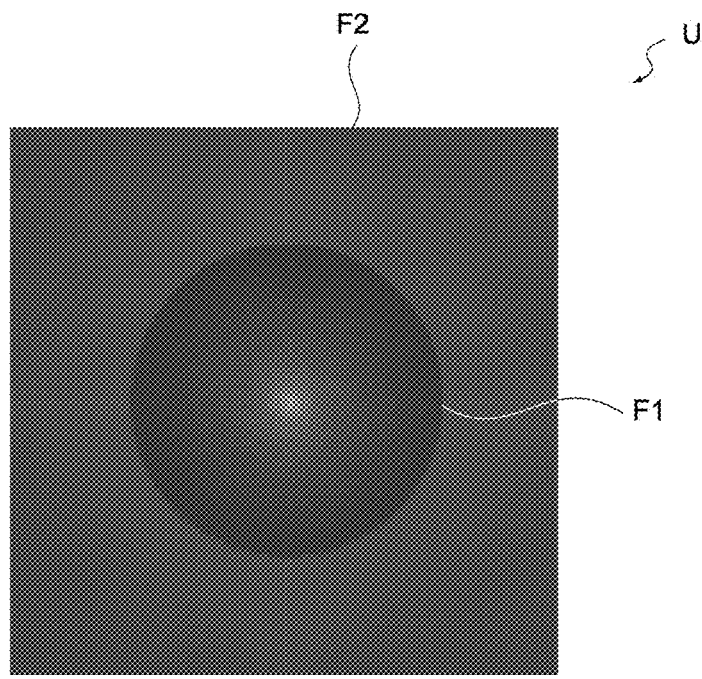
FIG. 15 A diagram showing an example of a combined image generated by the image generation unit in the microscopic system.

Next, the image generation unit 132 combines the low frequency area F1 and the high frequency area F2 with each other (St110). FIG. 15 is a schematic diagram showing a combined image U. As shown in the figure, the image generation unit 132 combines the low frequency area F1 and the high frequency area F2 with each other such that the cutout boundary S1 and the cutout boundary S2 (see FIGS. 11 and 12) match.

Next, the image generation unit 132 converts the combined image U into a spatial area image (St111). Specifically, the image generation unit 132 can apply the inverse Fourier transform to the combined image U to convert both images into a spatial frequency area image. For the inverse Fourier transform, the inverse fast Fourier transform (IFFT) can be used. Alternatively, the image conversion unit 131 may use another frequency analysis algorithm to convert the combined image U into a spatial area image.

Figure 16:
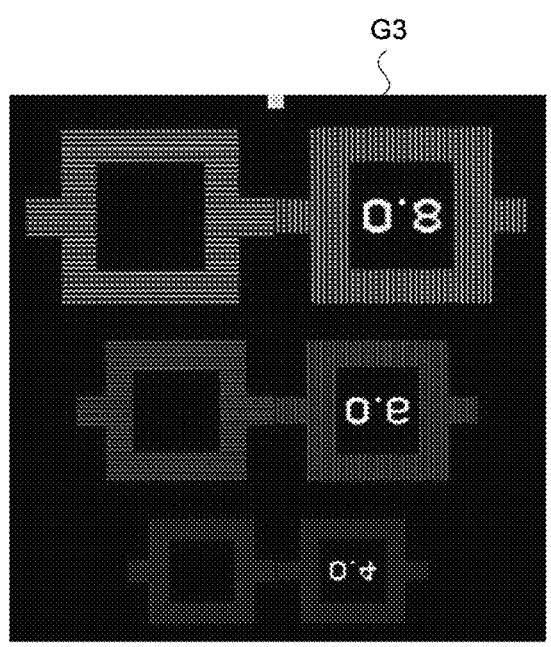
FIG. 16 A diagram showing an example of a composite image generated by the image generation unit in the microscopic system.

By this conversion, a composite image is generated. FIG. 16 shows a composite image G3 thus generated. The image generation unit 132 can display the composite image G3 on, for example, the display 140, and present it to the user.

Note that although the image conversion unit 131 generates the first spatial frequency area image H1 and the second spatial frequency area image H2 in which the center of the image is a low frequency component and the edge of the image is a high frequency component (St107) in the above description, the spatial frequency area image may be generated in another format. For example, the image conversion unit 131 may generate a spatial frequency area image such that the center of the image is a high frequency component and the edge of the image is a low frequency component.

In this case, the image generation unit 132 can set the cutout boundary S1 and the cutout boundary S2 on a predetermined frequency position or in a predetermined shape in the first spatial frequency area image H1 and the second spatial frequency area image H2, and cut out the low frequency area F1 from the first spatial frequency area image H1 and the high frequency area F2 from the second spatial frequency area image H2.

<Effects of Microscopic System>

Effects of the microscopic system 100 will be described.

As described above, the microscopic system 100 applies the first illumination light L1 and the second illumination light L2, and picks up the first picked-up image G1 and the second picked-up image G2. Here, frequency properties of the illumination light differ depending on the wavelength band thereof.

Figure 17:
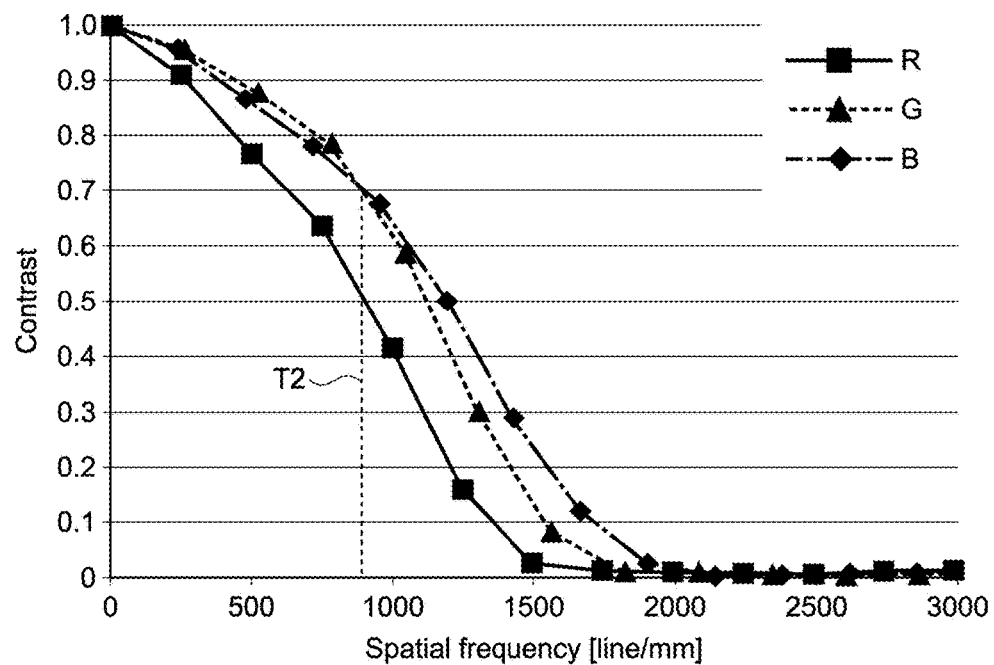
FIG. 17 A graph showing the spatial frequency response characteristics of illumination light at a magnification of ×20 under a microscope.
Figure 18:
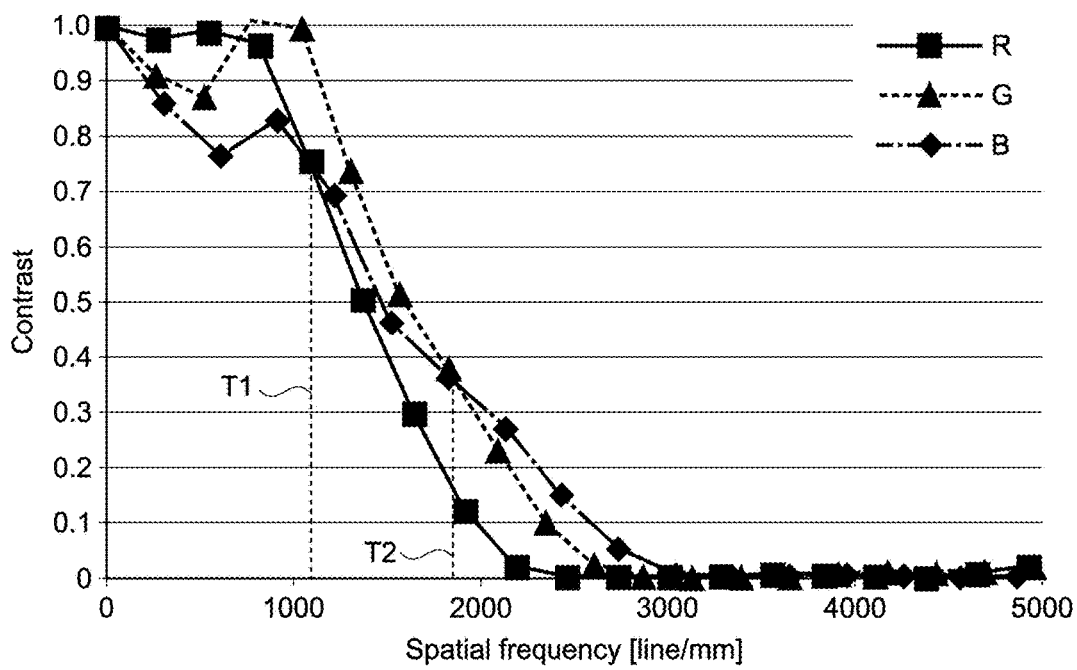
FIG. 18 A graph showing the spatial frequency response characteristics of illumination light at a magnification of ×60 under a microscope.

FIGS. 17 and 18 show the results obtained by applying illumination light to a resolving power chart, picking up an image via the microscope optical system, and calculating a spatial frequency response by the slanted-edge method. In both figures, the horizontal axis represents the line density (line/mm) of the resolving power chart, i.e., spatial frequency, and the vertical axis represents the contrast. FIG. 17 shows the results obtained from the microscope optical system including an objective lens (NA 0.45) having a magnification of ×20, and FIG. 18 shows the results obtained from the microscope optical system including an objective lens (NA 0.75) having a magnification of ×60.

Figure 19:
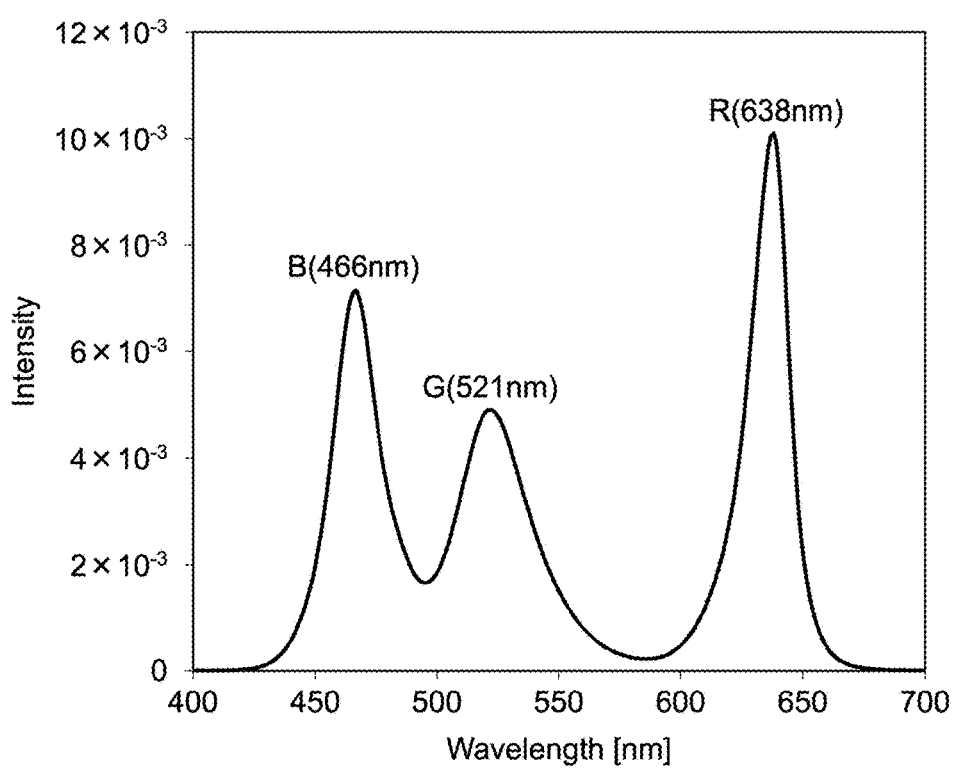
FIG. 19 A diagram showing the spectrum of illumination light.

FIG. 19 shows the spectrum of illumination light. The illumination is narrow band illumination using an LED light source, and has the peak wavelengths at 466 nm (blue), 521 nm (green), and 638 nm (red).

In the spatial frequency response at the magnification of ×20 shown in FIG. 17, the contrasts of blue color (B) and green color (G) are generally higher than the contrast of red color (R). Specifically, it is found that in this magnification, an image having a higher contrast can be picked up by using, as the illumination light, blue light or green light as compared with the case where red light is used.

On the other hand, in the spatial frequency response at the magnification of ×60 shown in FIG. 18, the contrast of red color (R) is higher than that of blue color (B) or green color (G) in a spatial frequency lower than approximately 1000 line/mm while the contrast of blue color (B) or green color (G) is higher than that of red color (R) in a spatial frequency higher than approximately 1000 line/mm. This spatial frequency in which the contrast of red color (R) and the contrast of blue color (B) are reversed is referred to as a reverse frequency T1.

Therefore, it is found that in this magnification, an image picked up with red light as the illumination light has a large contrast in a frequency band lower than the reverse frequency T1, and an image picked up with blue light as the illumination light has a higher contrast in a frequency band higher than the reverse frequency T1.

Further, in FIGS. 17 and 18, a spatial frequency in which the contrast of blue color and the contrast of green color are reversed is referred to as a reverse frequency T2.

As described above, it is found that in an optical microscope, the wavelength band of the illumination light in which the highest contrast is acquired differs for each spatial frequency of the observation target object, an image picked up with red illumination light has a higher contrast in a low frequency band, and an image picked up with blue or green illumination light has a higher contrast in a high frequency band, in the case where the magnification of the microscope optical system is high.

The first picked-up image G1 according to this embodiment is picked up under irradiation of the first illumination light L1 (e.g., red light), which is narrow band light in a long wavelength band, and the second picked-up image G2 is picked up under irradiation of the second illumination light L2 (e.g., blue light), which is narrow band light in a short wavelength band. Therefore, the first picked-up image G1 has a higher contrast in a low frequency band than that of the second picked-up image G2, and the second picked-up image G2 has a higher contrast in a high frequency band than that of the first picked-up image G1.

Then, as described above, the image generation unit 132 converts the first picked-up image G1 into the first spatial frequency area image H1, and cuts out the low frequency area F1 therefrom. Specifically, the low frequency area F1 is obtained by extracting components in a low frequency band having a high contrast in the first picked-up image G1. Further, the image generation unit 132 converts the second picked-up image G2 into the second spatial frequency area image H2, and cuts out the high frequency area F2 therefrom. Specifically, the high frequency area F2 is obtained by extracting components in a high frequency band having a high contrast in the second picked-up image G2.

Therefore, the combined image U generated by the image generation unit 132 combining the low frequency area F1 and the high frequency area F2 with each other is a spatial frequency area image including a low frequency component of the first picked-up image G1 and a high frequency component of the second picked-up image G2. As a result, the composite image G3 obtained by converting the combined image U into a spatial area image includes a low frequency component of the first picked-up image G1 and a high frequency component of the second picked-up image G2.

As described above, the low frequency band of the first picked-up image G1 has a contrast higher than that of the low frequency band of the second picked-up image G2, and the high frequency band of the second picked-up image G2 has a contrast higher than that of the high frequency band of the first picked-up image G1. Therefore, the composite image G3 has a higher contrast in the high frequency band than that of the first picked-up image G1, and a higher contrast in the low frequency band than that of the second picked-up image G2. Specifically, the composite image G3 has a high contrast in all frequency bands (a low frequency band and a high frequency band), and has good resolution.

Note that as described above, under irradiation of the first illumination light L1 and the second illumination light L2, the focal point of the microscope optical system is adjusted in the first picked-up image G1 and the second picked-up image G2, respectively. In the case of light that is not narrow band light (e.g., white light), the focal position is displaced depending on the wavelength band. Therefore, a picked-up image with light that is not narrow band light as the illumination light has a lower contrast in the low frequency band and the high frequency band than that of the first picked-up image G1 and the second picked-up image G2, respectively. Specifically, the composite image G3 has a higher contrast in all frequency bands than that of a picked-up image with light that is not narrow band light as the illumination light, and has good resolution.

As described above, by using the microscopic system 100, it is possible to acquire a high-resolution image of the observation target object P. As described above, in the microscopic system 100, images that have been optically resolved under irradiation of the first illumination light L1 and the second illumination light L2 are rendered as the composite image G3. Therefore, because the composite image G3 is not one obtained by rendering images that have not optically been resolved by image processing, and scientific accuracy is maintained, it can be used for scientific verification without inconvenience.

Second Embodiment

A microscopic system 200 according to a second embodiment of the present technology will be described. Note that in the description of this embodiment, the same configurations as those of the microscopic system 100 according to the first embodiment will be denoted by the same reference symbols, and a description thereof will be omitted.

<Configuration of Microscopic System>

Figure 20:
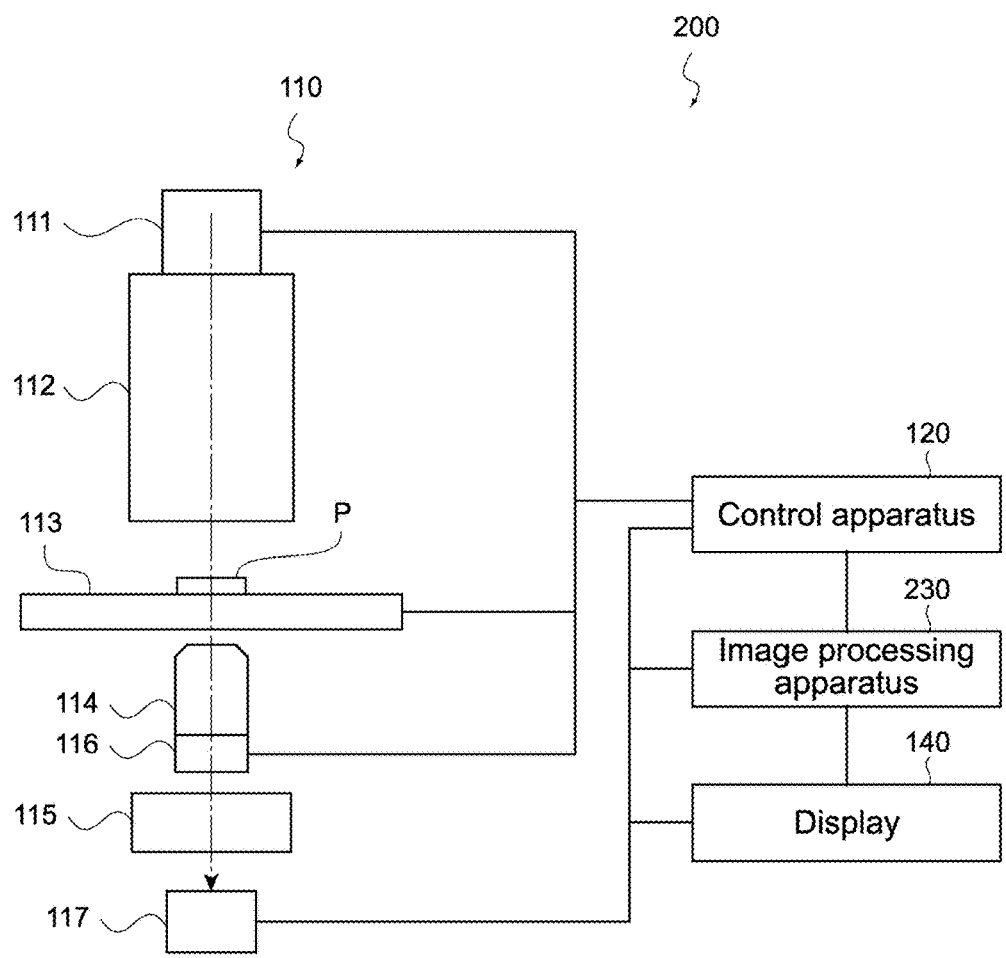
FIG. 20 A schematic diagram of a microscopic system according to a second embodiment of the present technology.

FIG. 20 is a schematic diagram showing the configuration of the microscopic system 200 according to this embodiment. Because the microscopic system 200 has the same configuration as that of the microscopic system 100 according to the first embodiment except that it includes an image processing apparatus 230, the configuration of the image processing apparatus 230 will be described.

Figure 21:
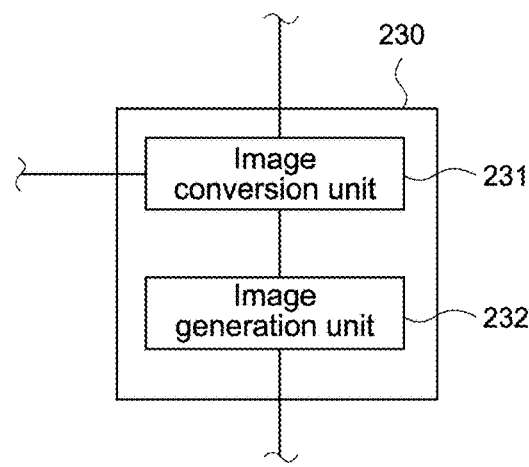
FIG. 21 A schematic diagram showing the functional configuration of an image processing apparatus in the microscopic system.

The image processing apparatus 230 performs image processing on an image picked up by the imaging unit 117. FIG. 21 is a schematic diagram showing the functional configuration of the image processing apparatus 130. As shown in the figure, the image processing apparatus 230 includes an image conversion unit 231 and an image generation unit 232. Description of the configurations of the image conversion unit 231 and the image generation unit 232 will be made in detail along with description of the operation of the microscopic system 200. The hardware configuration of the image processing apparatus 230 can be the same as that of the image processing apparatus 130 according to the first embodiment (see FIG. 4). The image conversion unit 231 and the image generation unit 232 have the functional configuration achieved by cooperation of the hardware configuration thereof with a program.

<Operation of Microscopic System>

The operation of the microscopic system 200 will be described. The operation to picking up of the second picked-up image G2 (see FIG. 5) is the same as that of the first embodiment. Specifically, the microscopic system 200 adjusts the focal position under irradiation of the first illumination light L1 that is narrow band light in a long wavelength band, and picks up the first picked-up image G1. Further, the microscopic system 200 adjusts the focal position under irradiation of the second illumination light L2 that is narrow band light in a short wavelength, and picks up the second picked-up image G2.

Figure 22:
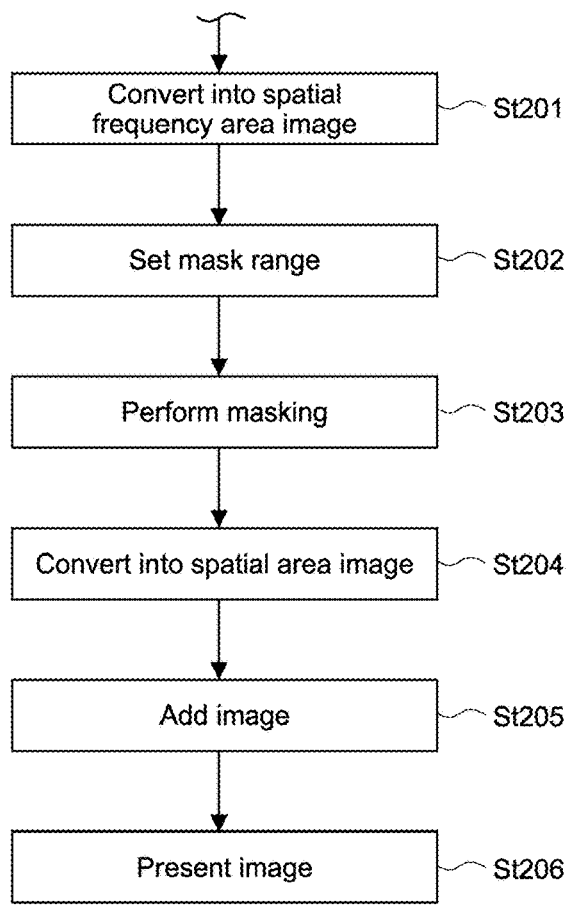
FIG. 22 A flowchart showing the operation of the microscopic system.

Next, as shown in FIG. 22, the image conversion unit 231 converts the first picked-up image G1 and the second picked-up image G2 into a spatial frequency area image (St201). The first picked-up image G1 and the second picked-up image G2 are each obtained by picking an image of the observation target object P, and are each a spatial area image. The image conversion unit 231 can perform frequency analysis on the first picked-up image G1 and the second picked-up image G2, and convert the first picked-up image G1 into the first spatial frequency area image and the second picked-up image G2 into the second spatial frequency area image.

Specifically, by applying the Fourier transform to the first picked-up image G1 and the second picked-up image G2, decomposing them into frequency components, and arranging them in predetermined coordinates, the image conversion unit 231 can convert both images into a spatial frequency area image. For the Fourier transform, fast Fourier transform (FFT) can be used. Further, the image conversion unit 231 may use another frequency analysis algorithm to convert the first picked-up image G1 and the second picked-up image G2 into a spatial frequency area image.

The image conversion unit 131 can decompose the first picked-up image G1 and the second picked-up image G2 into frequency components, and arrange the frequency components such that a low frequency component is arranged on the center of the image and a high frequency component is arranged on the edge of the image, thereby generating a spatial frequency area image. The image conversion unit 231 generates the first spatial frequency area image H1 (see FIG. 9) from the first picked-up image G1, and the second spatial frequency area image H2 (see FIG. 10) from the second picked-up image G2.

Figure 23:
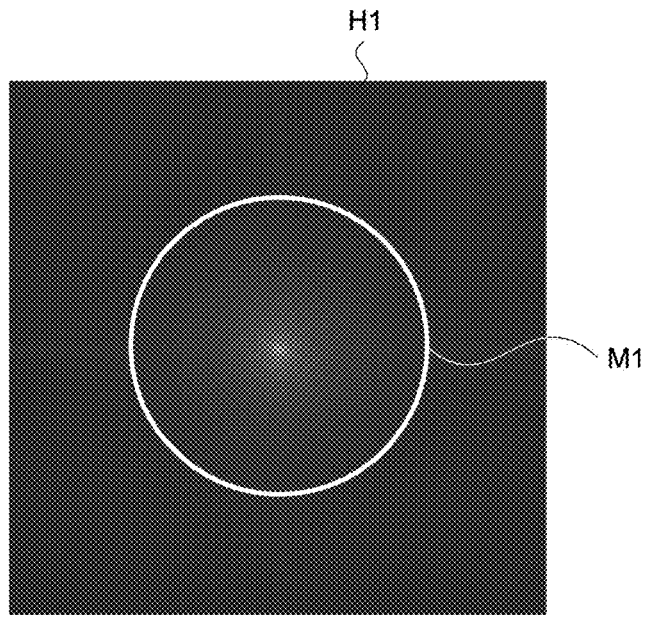
FIG. 23 A schematic diagram showing a mask range set for a first spatial frequency area image by the image generation unit in the microscopic system.
Figure 24:
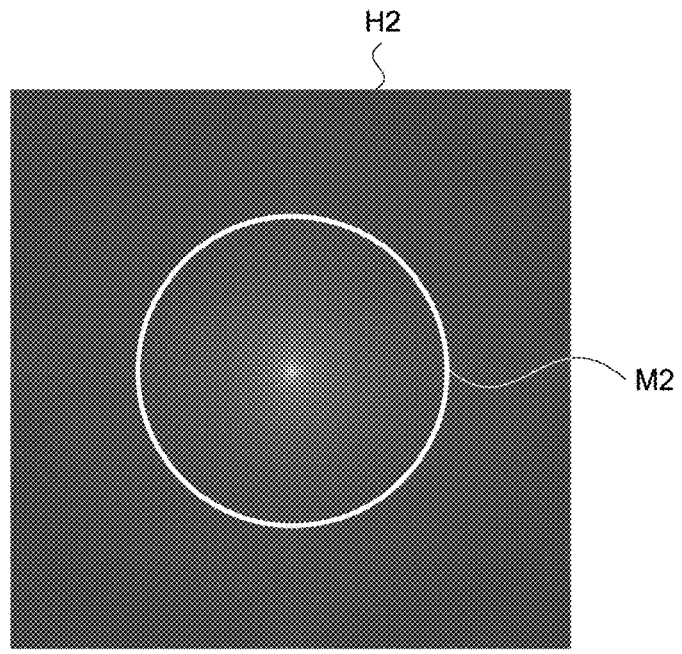
FIG. 24 A schematic diagram showing a mask range set for a second spatial frequency area image by the image generation unit in the microscopic system.

Next, the image generation unit 232 sets a mask range for the first spatial frequency area image H1 and the second spatial frequency area image H2 (St202). FIG. 23 is a diagram showing a mask range M1 set for the first spatial frequency area image H1, and FIG. 24 is a diagram showing a mask range M2 set for the second spatial frequency area image H2.

As shown in the figures, the image generation unit 232 can set, as the mask range M1 and the mask range M2, a circle with the same diameter around the image center in both of the spatial frequency area images. The distance from the image center in both of the spatial frequency area images is a frequency, and a circle around the center of the image corresponds to a particular frequency. This frequency may be determined in advance. Alternatively, the image generation unit 232 may determine the frequency by analyzing the first spatial frequency area image H1 and the second spatial frequency area image H2. However, the frequency is favorably a frequency that is close to the above-mentioned reverse frequency.

Further, the mask range does not necessarily need to have a circular shape, and may have a rectangular shape or elliptical shape around the center of the image. However, as described above, a circle around the center of a spatial frequency area image corresponds to a particular frequency, and thus is used favorably.

Figure 25:
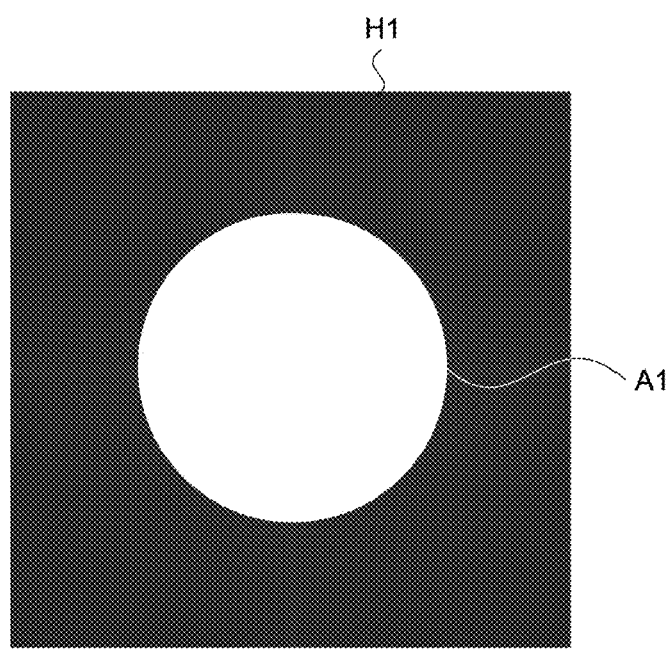
FIG. 25 A schematic diagram showing masking performed on the first spatial frequency area image by the image generation unit in the microscopic system.

Next, the image generation unit 232 performs masking on the first spatial frequency area image H1 and the second spatial frequency area image H2 (St203). FIG. 25 is a schematic diagram showing masking performed on the first spatial frequency area image H1. As shown in the figure, the image generation unit 232 applies a masking A1 to the mask range M1 in the first spatial frequency area image H1. The masking A1 shown with white color represents that frequency components in the masking Al are transmitted therethrough (used for the next conversion into a spatial area image).

Figure 26:
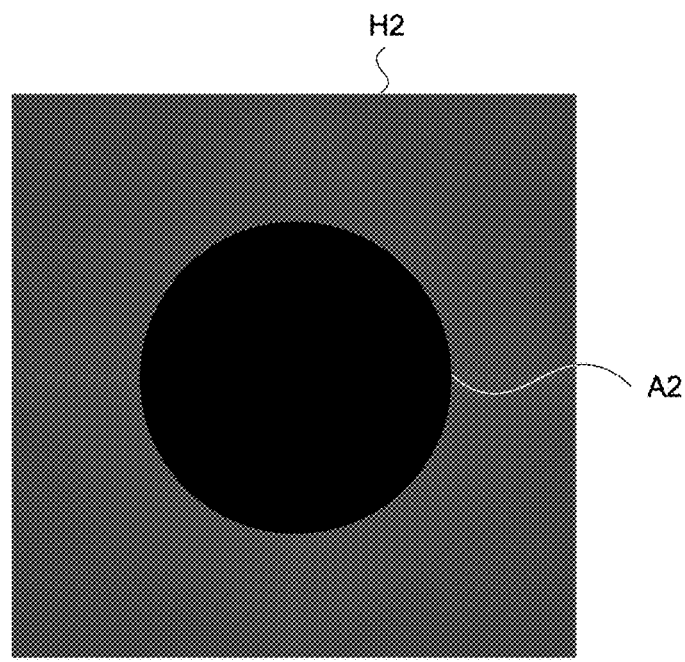
FIG. 26 A schematic diagram showing masking performed on the second spatial frequency area image by the image generation unit in the microscopic system.

FIG. 26 is a schematic diagram showing masking performed on the second spatial frequency area image H2. As shown in the figure, the image generation unit 232 applies a masking A2 to the mask range M2 in the second spatial frequency area image H2. The masking A2 shown with black color represents that frequency components in the masking A2 are blocked (not used for the next conversion into a spatial area image).

Figure 27:
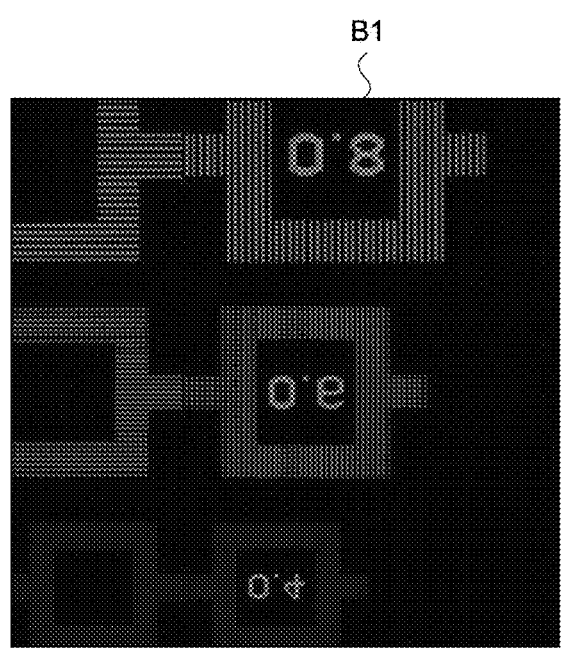
FIG. 27 A diagram showing an example of a low frequency component image generated by the image generation unit in the microscopic system.

Next, the image generation unit 232 converts the first spatial frequency area image H1 and the second spatial frequency area image H2 into a spatial area image (St204). The image generation unit 232 applies the inverse Fourier transform such as IFFT to the first spatial frequency area image H1 to convert the first spatial frequency area image H1 into a spatial frequency area image. Here, because the masking A1 is applied to the first spatial frequency area image H1, only the low frequency area located at the vicinity of the center of the first spatial frequency area image H1 is converted by the inverse Fourier transform, and a low frequency component image including only the low frequency components of the first spatial frequency area image H1 is generated. FIG. 27 shows a low frequency component image B1 converted from the first spatial frequency area image H1.

Figure 28:
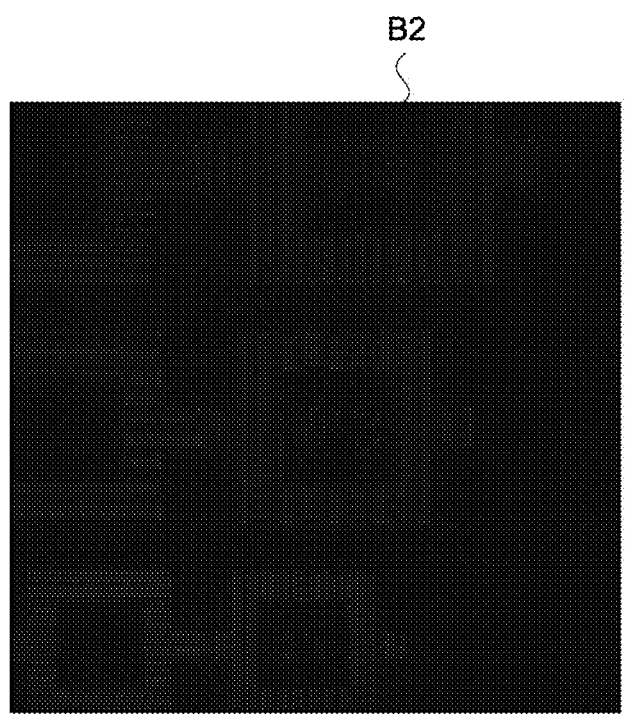
FIG. 28 A diagram showing an example of a high frequency component image generated by the image generation unit in the microscopic system.

Further, the image generation unit 232 applies the inverse Fourier transform such as IFFT also to the second spatial frequency area image H2 to convert the second spatial frequency area image H2 into a spatial frequency area image. Here, because the masking A2 is applied to the second spatial frequency area image H2, only the high frequency area located at the vicinity of the edge of the second spatial frequency area image H2 is converted by the inverse Fourier transform, and a high frequency component image including only the high frequency components of the second spatial frequency area image H2 is generated. FIG. 28 shows a high frequency component image B2 converted from the second spatial frequency area image H2.

Next, the image generation unit 232 adds the low frequency component image B1 and the high frequency component image B2 (St205) to each other. Specifically, the image generation unit 232 adds the brightness value of the low frequency component image B1 and the brightness value of the high frequency component image B2 to each other for each pixel coordinate. Accordingly, a composite image (see FIG. 16) is generated. The image generation unit 232 can display the generated composite image on, for example, the display 140, and present it to the user.

Note that although the image conversion unit 231 generates the first spatial frequency area image H1 and the second spatial frequency area image H2 in which the center of the image is a low frequency component and the edge of the image is a high frequency component (St201) in the above description, the spatial frequency area image may be generated in another format. For example, the image conversion unit 231 may generate a spatial frequency area image such that the center of the image is a high frequency component and the edge of the image is a low frequency component.

In this case, the image generation unit 232 can set the mask range M1 and the mask range M2 on a predetermined frequency position or in a predetermined shape in the first spatial frequency area image H1 and the second spatial frequency area image H2, and perform masking on the high frequency components in the first spatial frequency area image H1 and the low frequency components in the second spatial frequency area image H2.

<Effects of Microscopic System>

The effects of the microscopic system 200 will be described.

The effects of the microscopic system 200 are equivalent to the effects of the microscopic system 100 according to the first embodiment. In the first embodiment, a picked-up image is converted into a spatial frequency area image (St107), the low frequency area and the high frequency area are combined with each other on the spatial frequency area (St110), and it is converted into a spatial area image (St111).

On the other hand, in this embodiment, a picked-up image is converted into a spatial frequency area image (St201), masking is performed on the spatial frequency area image (St203) before it is converted into a spatial area image (St204), and the spatial area image is added (St205).

Specifically, in both embodiments, equivalent results are obtained because the difference between them is only that the low frequency components and the high frequency components are combined with each other either in the spatial frequency area or in the spatial area. Therefore, by using the microscopic system 200, it is possible to acquire a high-resolution image of the observation target object P. In addition, because both images maintain scientific accuracy, it is possible to use the image for scientific verification without inconvenience.

MODIFIED EXAMPLE

A modified example of the first embodiment and the second embodiment will be described.

In these embodiment, two kinds of illumination light of the first illumination light L1 and the second illumination light L2 have been used. However, third illumination light that has a wavelength band different from those of the first illumination light L1 and the second illumination light L2 and is narrow band light may be further used. The third illumination light can be, for example, green light (not less than 500 nm and not more than 570 nm) having a full width at half maximum of the spectrum of not less than 10 nm and not more than 100 nm.

Figure 29:
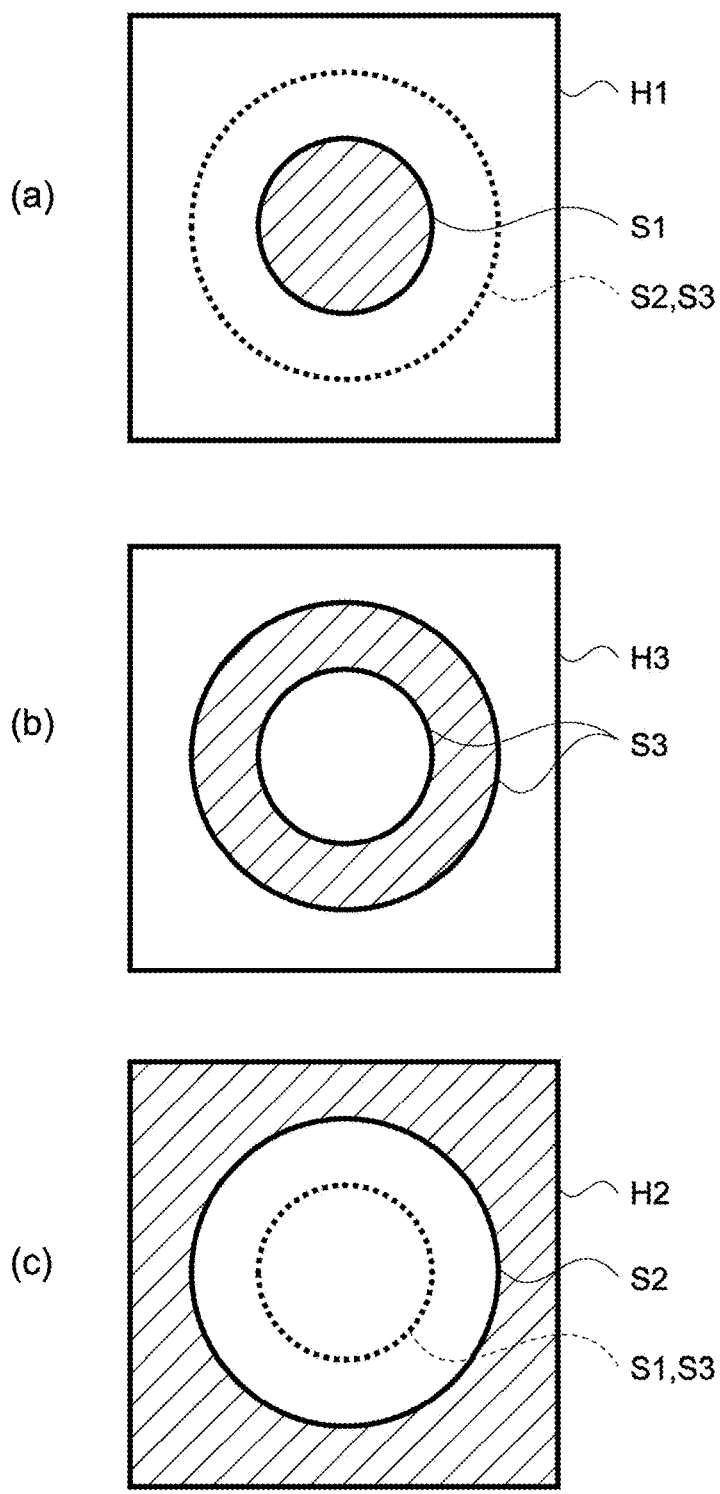
FIG. 29 A schematic diagram showing cutout boundaries set for spatial frequency area images by an image generation unit of a microscopic system according to a modified example of the present technology.

In this case, the image conversion unit converts a third picked-up image picked up under illumination of the third illumination light into a spatial frequency area image in addition to the first picked-up image and the second picked-up image. Further, the image generation unit sets a cutout boundary for each spatial frequency area image. FIG. 29 is a schematic diagram showing the cutout boundaries in this case. Part (a) of FIG. 29 shows the cutout boundary S1 set for the first spatial frequency area image H1, part (b) of FIG. 29 shows a cutout boundary S3 set for a third spatial frequency area image H3, and part (c) of FIG. 29 shows the cutout boundary S2 set for the second spatial frequency area image H2. The cutout boundary S1 can be, for example, a frequency that corresponds to the above-mentioned reverse frequency T1 (see FIG. 18), and the cutout boundary S2 can be, for example, a frequency that corresponds to the above-mentioned reverse frequency T2 (see FIG. 18).

Note that the wavelength band of the illumination light of the picked-up image that is the conversion source of each spatial frequency area image is longer in the order from the first to the third. Next, the image generation unit combines the frequency areas surrounded in the cutout boundaries in the spatial frequency area images with each other to acquire a combined image, and converts the combined image into a composite image that is a spatial area image. Here, description has been made according to the first embodiment. However, similarly to the second embodiment, it is also possible to perform masking, convert it into spatial area images, and add the spatial area images. Further, in the case where three kinds of illumination light are used, the image generation unit may perform color calculation to generate a color image.

Further, the first illumination light and the second illumination light are not limited to narrow band light having different frequency bands. When the illumination NA of the illumination light is a high NA, the contrast of the low frequency band is lowered while the resolution power in the high frequency band is improved. Therefore, the above-mentioned embodiment may be applied with illumination light having a low NA and illumination light having a high NA as the first illumination light and the second illumination light, respectively. Also in this case, it is possible to acquire a high-resolution image in which the contrast of the low frequency band and the contrast of the high frequency band are high.

EXAMPLE

An example of the present technology will be described.

From the spatial frequency response shown in FIG. 18, it is found that the reverse frequency T1 is approximately 1000 line/mm in the case of the magnification of the microscope optical system of ×60. In view of the above, images of a resolution power chart of the frequency of 625 line/mm and 1250 line/mm close to 1000 line/mm were picked up under irradiation of red illumination light and blue illumination light, respectively, and a composite image was generated with the method shown in the above-mentioned embodiment. Further, the contrasts of the images were calculated.

Figure 30:
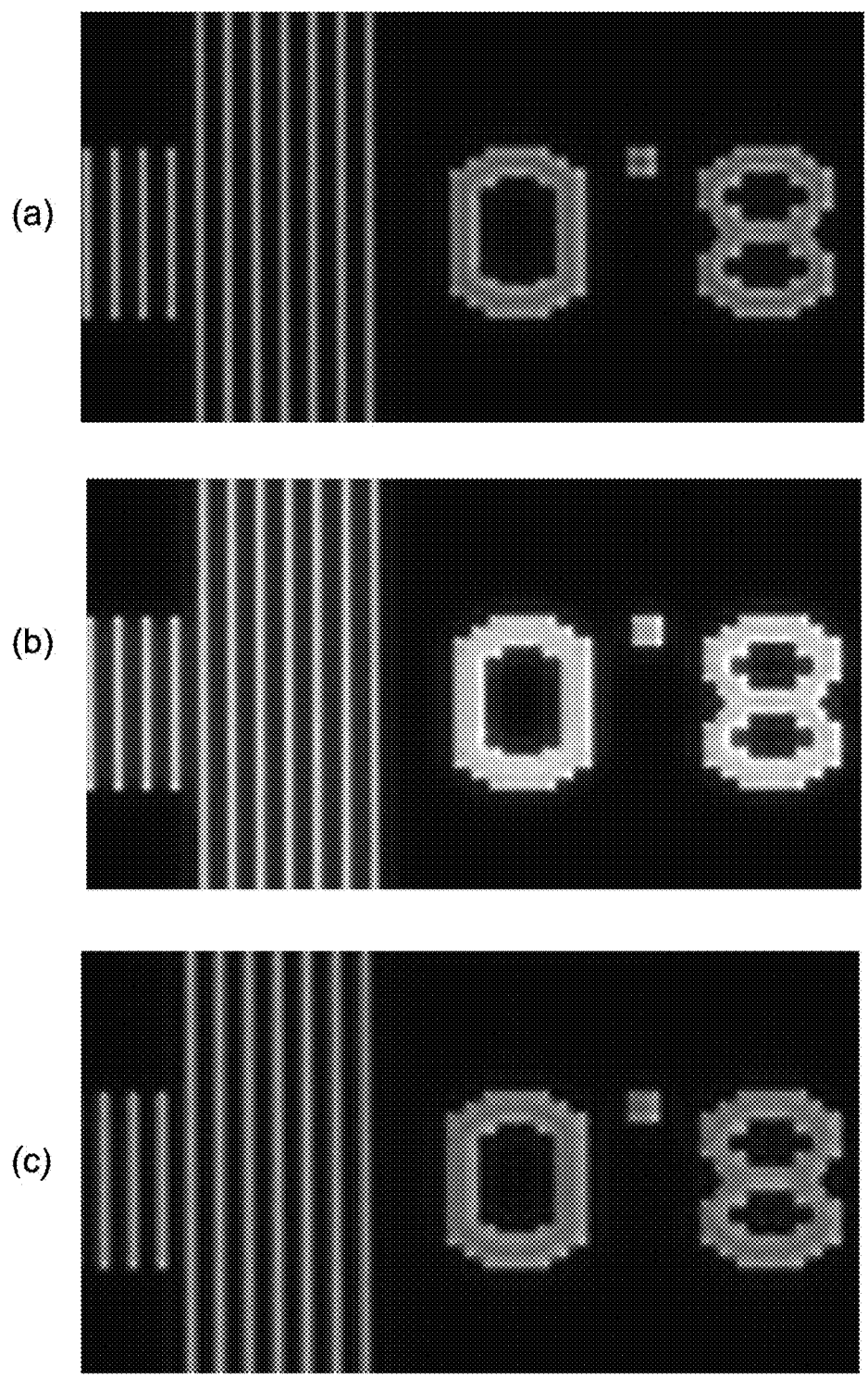
FIG. 30 A diagram showing a first picked-up image, a second picked-up image, and a composite image in a low frequency band according to an example of the present technology.
Figure 31:
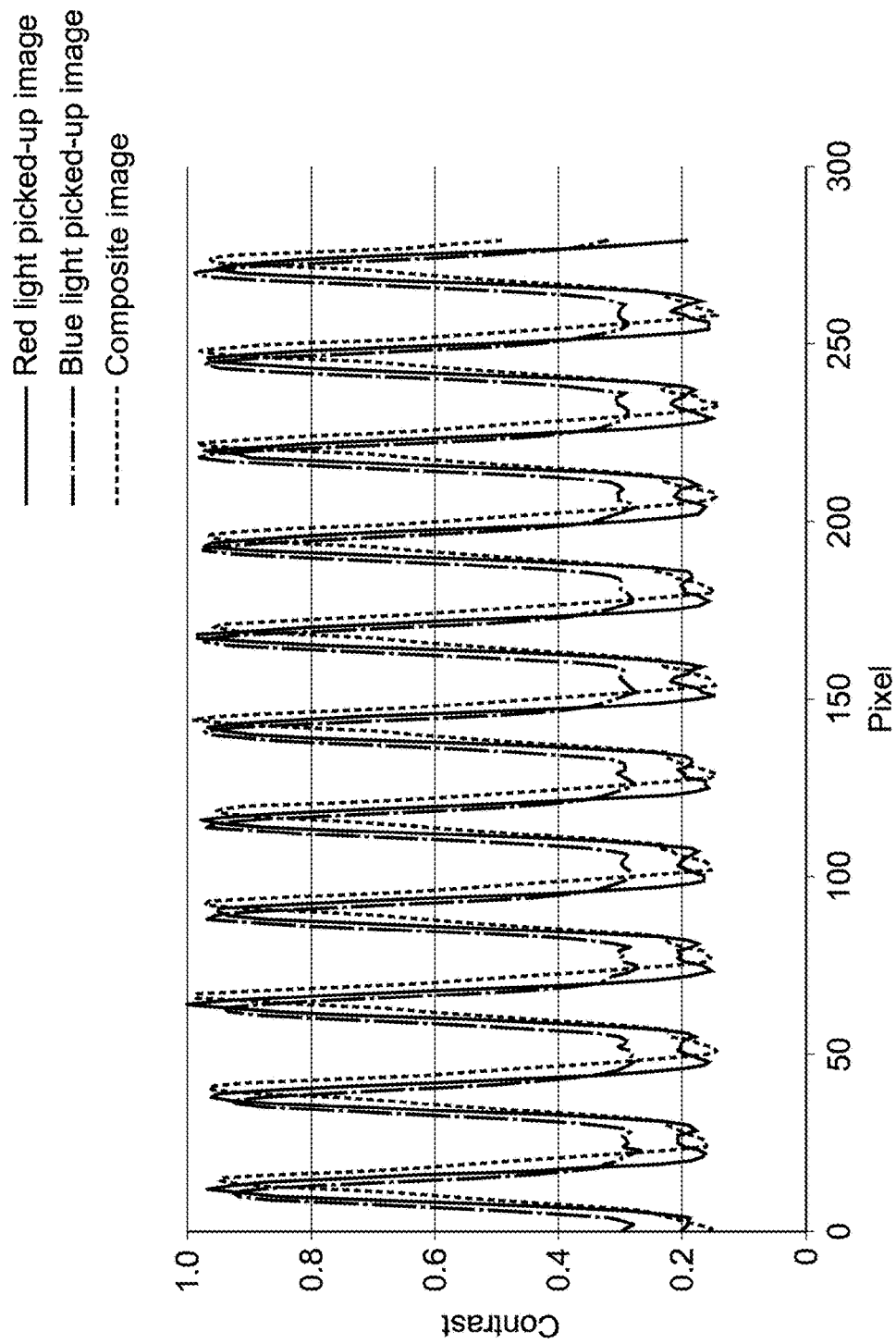
FIG. 31 A graph showing each contrast of the first picked-up image, the second picked-up image, and the composite image in the low frequency band according to the example of the present technology.

FIG. 30 shows picked-up images obtained by picking up images of a resolution power chart of 625 line/mm and the generated composite image, and FIG. 31 is a graph showing the contrast of each image. Note that the graph shown in FIG. 31 is normalized at the peak.

Part (a) of FIG. 30 shows a picked-up image under the red illumination light (having a peak wavelength of 638 nm), and the contrast was 0.95. Part (b) of FIG. 30 shows a picked-up image under the blue illumination light (having a peak wavelength of 466 nm), and the contrast was 0.69. As shown in FIG. 18, the contrast under the red illumination light is high in the frequency of 625 line/mm. Actually, the contrast under the red illumination light (0.95) was higher than the contrast under the blue illumination light (0.68).

From the picked-up image under the red illumination light shown in part (a) of FIG. 30 and the picked-up image under the blue illumination light shown in part (b) of FIG. 30, a composite image was generated with the method described in the second embodiment. The mask range was the reverse frequency (1000 line/mm). Part (c) of FIG. 30 shows the generated high-resolution image. The contrast of this image was 0.97, and was equivalent to the contrast of the picked-up image under the red illumination light (0.95).

Because the frequency of this resolution power chart (625 line/mm) is lower than the reverse frequency, it is found that the contrast of the picked-up image under the red illumination light is reflected on the composite image and a high contrast equivalent to the contrast of the picked-up image under the red illumination light is acquired.

Figure 32:
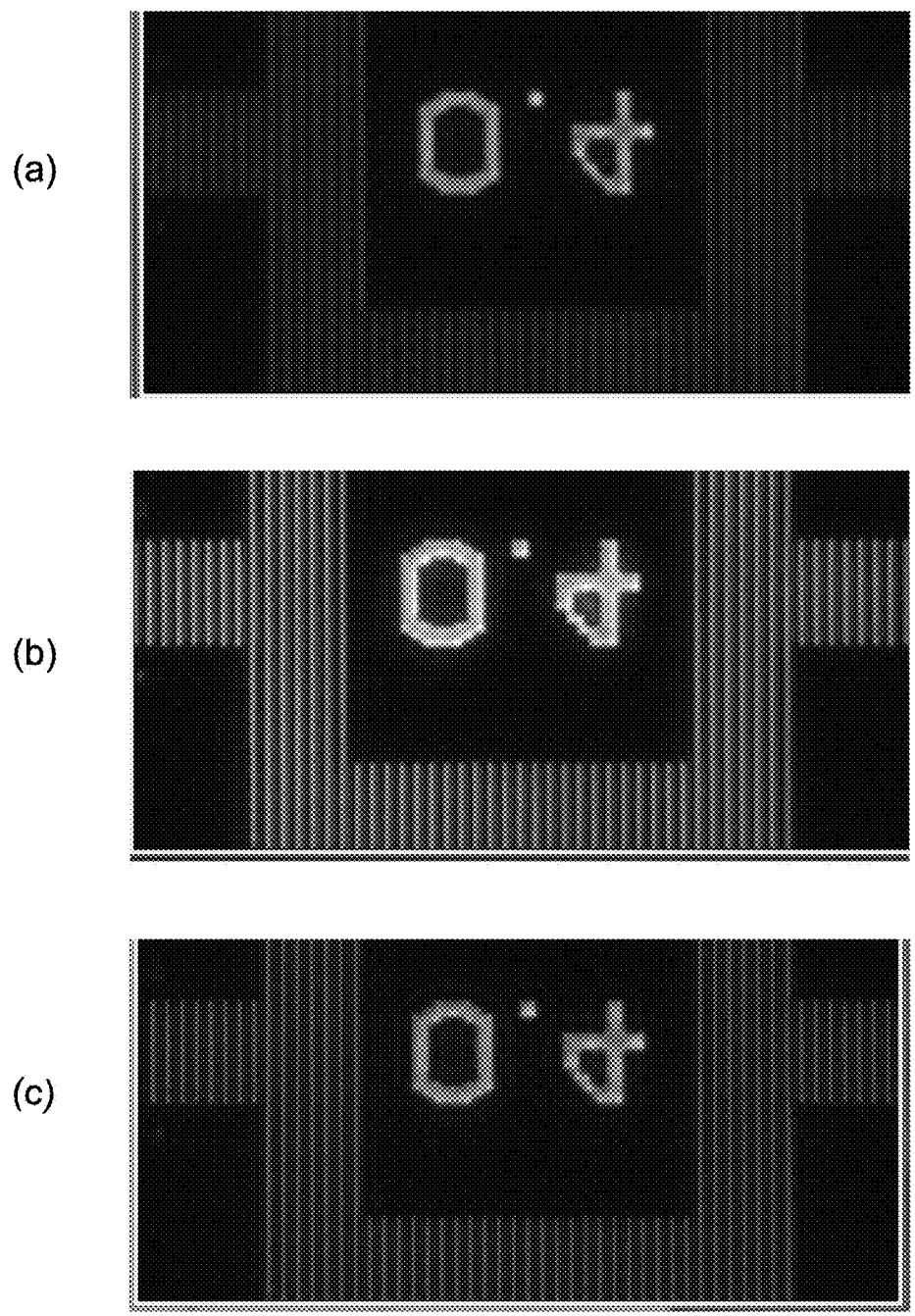
FIG. 32 A diagram showing the first picked-up image, the second picked-up image, and the composite image in a high frequency band according to the example of the present technology.
Figure 33:
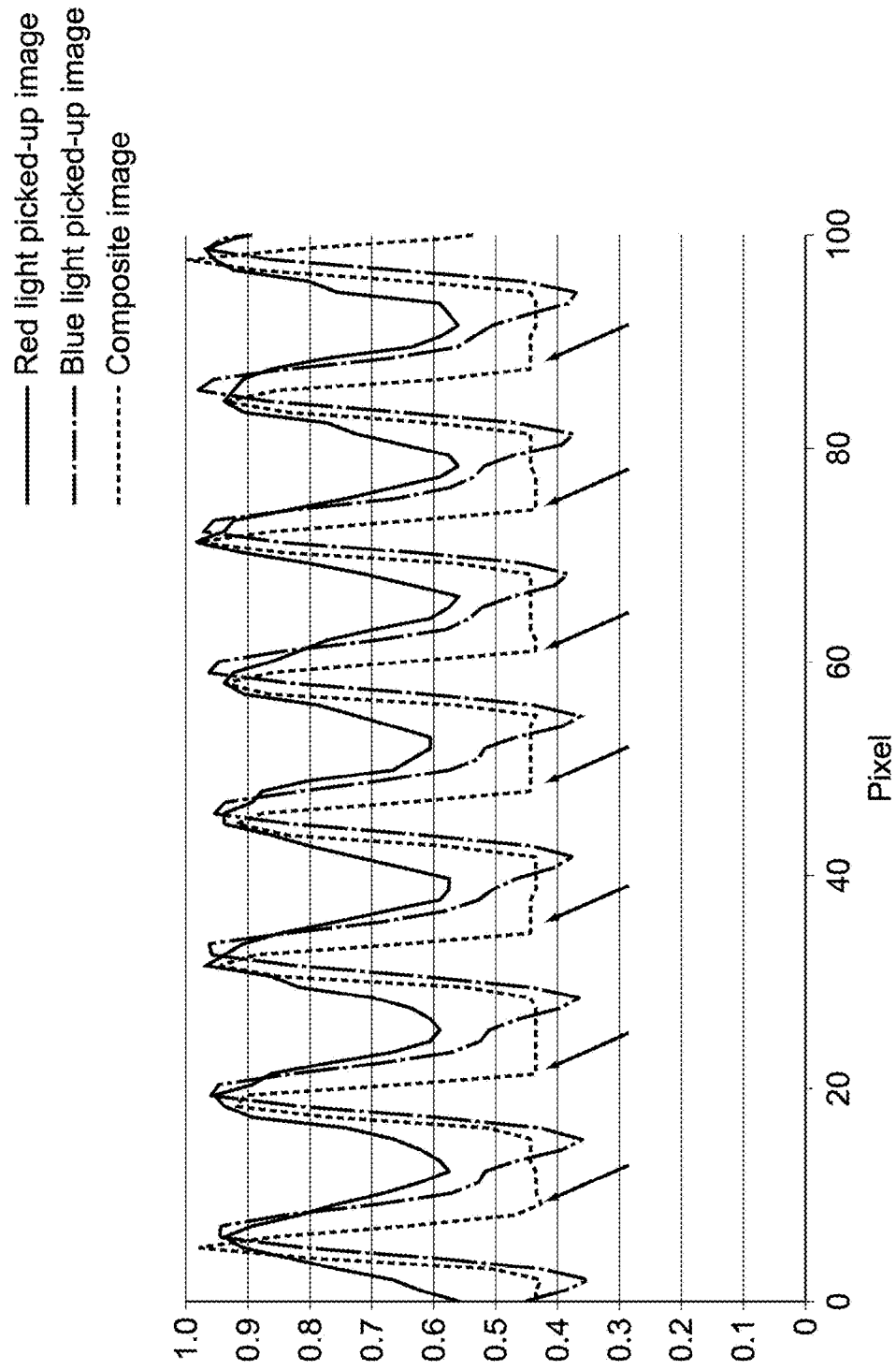
FIG. 33 A graph showing each contrast of the first picked-up image, the second picked-up image, and the composite image in the high frequency band according to the example of the present technology.

FIG. 32 shows picked-up images obtained by picking up images of a resolution power chart of 1250 line/mm and the generated composite image, and FIG. 33 is a graph showing the contrast of each image. Note that the graph shown in FIG. 33 is normalized at the peak.

Part (a) of FIG. 32 shows a picked-up image under the red illumination light (having a peak wavelength of 638 nm), and the contrast was 0.17. Part (b) of FIG. 32 shows a picked-up image under the blue illumination light (having a peak wavelength of 466 nm), and the contrast was 0.42. As shown in FIG. 18, the contrast under the blue illumination light is high in the frequency of 1250 line/mm. Actually, the contrast under the blue illumination light (0.42) was higher than the contrast under the red illumination light (0.17).

From the picked-up image under the red illumination light shown in part (a) of FIG. 32 and the picked-up image under the blue illumination light shown in part (b) of FIG. 32, a composite image was generated with the method described in the second embodiment. The mask range was the reverse frequency (1000 line/mm). Part (c) of FIG. 32 shows the generated high-resolution image. The contrast of this image was 0.38, and was equivalent to the contrast of the picked-up image under the blue illumination light (0.42).

Because the frequency of this resolution power chart (1250 line/mm) is higher than the reverse frequency, it is found that the contrast of the picked-up image under the blue illumination light is reflected on the high-resolution image and a high contrast equivalent to the contrast of the picked-up image under the blue illumination light is acquired.

Further, in FIG. 33, a pedestal in the contrast under the blue illumination light is removed in the contrast of the composite image (arrow in the figure), and artifact due to diffraction is alleviated.

As described above, the composite image generated by the method according to the embodiment of the present technology has a contrast in a low frequency band equivalent to the contrast in a low frequency band under the illumination light in a long wavelength band (red light), and a contrast in a high frequency band equivalent to the contrast in a high frequency band under the illumination light in a short wavelength band (blue light). Specifically, the effects obtained by the embodiment of the present technology are verified.

It should be noted that the present technology may take the following configurations.

(1)
An image processing apparatus, including:
an image conversion unit that converts a first picked-up image and a second picked-up image into frequency components, the first picked-up image being obtained by picking up an image of an observation target object with first illumination light via a microscope optical system, the second picked-up image being obtained by picking up an image of the observation target object with second illumination light via the microscope optical system, the second picked-up image having a contrast in a low frequency band lower than that of the first picked-up image and a contrast in a high frequency band higher than that of the first picked-up image; and
an image generation unit that combines a low frequency component of the first picked-up image and a high frequency component of the second picked-up image with each other to generate a composite image.

(2)
The image processing apparatus according to (1) above, in which
the first illumination light is narrow band light in a wavelength band longer than that of the second illumination light, and
the second illumination light is narrow band light in a wavelength band shorter than that of the first illumination light.

(3)
The image processing apparatus according to (1) or (2) above, in which
the first illumination light is red light, and
the second illumination light is blue light.

(4)
The image processing apparatus according to any one of (1) to (3) above, in which
the first illumination light has an illumination NA lower than that of the second illumination light, and
the second illumination light has an illumination NA higher than that of the first illumination light.

(5)
The image processing apparatus according to any one of (1) to (4), in which
the image conversion unit converts the first picked-up image into a spatial frequency area image to generate a first spatial frequency area image, and the second picked-up image into a spatial frequency area image to generate a second spatial frequency area image, and
the image generation unit generates the composite image from a low frequency area of the first spatial frequency area image and a high frequency area of the second spatial frequency area image.

(6)
The image processing apparatus according to any one of (1) to (5) above, in which
the image generation unit generates a combined image obtained by combining the low frequency area and the high frequency area with each other, and generates the composite image by converting the combined image into a spatial area image.

(7)
The image processing apparatus according to (1) to (6) above, in which
the image generation unit generates a low frequency component image obtained by converting the low frequency area into a spatial area image and a high frequency component image obtained by converting the high frequency area into a spatial area image, and generates the composite image by adding the low frequency component image and the high frequency component image to each other.

(8)
An image processing program, including:
an image conversion unit that converts a first picked-up image and a second picked-up image into frequency components, the first picked-up image being obtained by picking up an image of an observation target object with first illumination light via a microscope optical system, the second picked-up image being obtained by picking up an image of the observation target object with second illumination light via the microscope optical system, the second picked-up image having a contrast in a low frequency band lower than that of the first picked-up image and a contrast in a high frequency band higher than that of the first picked-up image; and
an image generation unit that combines a low frequency component of the first picked-up image and a high frequency component of the second picked-up image with each other to generate a composite image.

(9)

An image processing method, including:

converting, by an image conversion unit, a first picked-up image and a second picked-up image into frequency components, the first picked-up image being obtained by picking up an image of an observation target object with first illumination light via a microscope optical system, the second picked-up image being obtained by picking up an image of the observation target object with second illumination light via the microscope optical system, the second picked-up image having a contrast in a low frequency band lower than that of the first picked-up image and a contrast in a high frequency band higher than that of the first picked-up image; and combining, by an image generation unit, a low frequency component of the first picked-up image and a high frequency component of the second picked-up image with each other to generate a composite image.

(10)

A microscopic system, including:

an illumination lamp that applies first illumination light and second illumination light;

a microscope optical system;

an imaging unit; and an image conversion unit that converts a first picked-up image and a second picked-up image into frequency components, the first picked-up image being obtained by picking up an image of an observation target object with the first illumination light via the microscope optical system, the second picked-up image being obtained by picking up an image of the observation target object with the second illumination light via the microscope optical system, the second picked-up image having a contrast in a low frequency band lower than that of the first picked-up image and a contrast in a high frequency band higher than that of the first picked-up image; and an image generation unit that combines a low frequency component of the first picked-up image and a high frequency component of the second picked-up image with each other to generate a composite image.

(11)

The microscopic system according to (10) above, further including:

a focus adjustment mechanism that adjust a focal position of the microscope optical system; and a control unit that controls the focus adjustment mechanism to cause the microscope optical system to focus on the observation target object under irradiation of the first illumination light, and cause the microscope optical system to focus on the observation target object under irradiation of the second illumination light.

(12)

The microscopic system according to (10) above, further including a control unit that controls a light amount of the first illumination light and the second illumination light so that exposure of the first picked-up image and exposure of the second picked-up image match.

DESCRIPTION OF REFERENCE NUMERALS 100, 200 microscopic system
110, 210 microscope
111 illumination lamp
112 illumination optical system
113 stage
114 objective lens
115 imaging lens
116 focus adjustment mechanism
117 imaging unit
120 control apparatus
130 image processing apparatus
131 image conversion unit
132 image generation unit
140 display

The invention claimed is:

1. An image processing apparatus, comprising:

an image conversion unit that converts a first picked-up image and a second picked-up image into frequency components, the first picked-up image being obtained by picking up an image of an observation target object with first illumination light via a microscope optical system, the second picked-up image being obtained by picking up an image of the observation target object with second illumination light via the microscope optical system, the second picked-up image having a contrast in a low frequency band lower than that of the first picked-up image and a contrast in a high frequency band higher than that of the first picked-up image; and an image generation unit that combines a low frequency component of the first picked-up image and a high frequency component of the second picked-up image with each other to generate a composite image.

2. The image processing apparatus according to claim 1, wherein the first illumination light is narrow band light in a wavelength band longer than that of the second illumination light, and the second illumination light is narrow band light in a wavelength band shorter than that of the first illumination light.

3. The image processing apparatus according to claim 2, wherein the first illumination light is red light, and
the second illumination light is blue light.

4. The image processing apparatus according to claim 1, wherein the first illumination light has an illumination NA lower than that of the second illumination light, and the second illumination light has an illumination NA higher than that of the first illumination light.

5. The image processing apparatus according to claim 1, wherein the image conversion unit converts the first picked-up image into a spatial frequency area image to generate a first spatial frequency area image, and the second picked-up image into a spatial frequency area image to generate a second spatial frequency area image, and the image generation unit generates the composite image from a low frequency area of the first spatial frequency area image and a high frequency area of the second spatial frequency area image.

6. The image processing apparatus according to claim 5, wherein the image generation unit generates a combined image obtained by combining the low frequency area and the high frequency area with each other, and generates the composite image by converting the combined image into a spatial area image.

7. The image processing apparatus according to claim 5, wherein the image generation unit generates a low frequency component image obtained by converting the low frequency area into a spatial area image and a high frequency component image obtained by converting the high frequency area into a spatial area image, and generates the composite image by adding the low frequency component image and the high frequency component image to each other.

8. An image processing program, comprising:

an image conversion unit that converts a first picked-up image and a second picked-up image into frequency components, the first picked-up image being obtained by picking up an image of an observation target object with first illumination light via a microscope optical system, the second picked-up image being obtained by picking up an image of the observation target object with second illumination light via the microscope optical system, the second picked-up image having a contrast in a low frequency band lower than that of the first picked-up image and a contrast in a high frequency band higher than that of the first picked-up image; and an image generation unit that combines a low frequency component of the first picked-up image and a high frequency component of the second picked-up image with each other to generate a composite image.

9. An image processing method, comprising:

converting, by an image conversion unit, a first picked-up image and a second picked-up image into frequency components, the first picked-up image being obtained by picking up an image of an observation target object with first illumination light via a microscope optical system, the second picked-up image being obtained by picking up an image of the observation target object with second illumination light via the microscope optical system, the second picked-up image having a contrast in a low frequency band lower than that of the first picked-up image and a contrast in a high frequency band higher than that of the first picked-up image; and combining, by an image generation unit, a low frequency component of the first picked-up image and a high frequency component of the second picked-up image with each other to generate a composite image.

10. A microscopic system, comprising:

an illumination lamp that applies first illumination light and second illumination light;

a microscope optical system;

an imaging unit; and an image conversion unit that converts a first picked-up image and a second picked-up image into frequency components, the first picked-up image being obtained by picking up an image of an observation target object with the first illumination light via the microscope optical system, the second picked-up image being obtained by picking up an image of the observation target object with the second illumination light via the microscope optical system, the second picked-up image having a contrast in a low frequency band lower than that of the first picked-up image and a contrast in a high frequency band higher than that of the first picked-up image; and an image generation unit that combines a low frequency component of the first picked-up image and a high frequency component of the second picked-up image with each other to generate a composite image.

11. The microscopic system according to claim 10, further comprising:

a focus adjustment mechanism that adjust a focal position of the microscope optical system; and a control unit that controls the focus adjustment mechanism to cause the microscope optical system to focus on the observation target object under irradiation of the first illumination light, and cause the microscope optical system to focus on the observation target object under irradiation of the second illumination light.

12. The microscopic system according to claim 10, further comprising a control unit that controls a light amount of the first illumination light and the second illumination light so that exposure of the first picked-up image and exposure of the second picked-up image match.

* * * * *